(12) United States Patent
Falconer et al.

(10) Patent No.: US 8,679,227 B2
(45) Date of Patent: Mar. 25, 2014

(54) HIGH FLUX SAPO-34 MEMBRANES FOR $CO_2/CH_4$ SEPARATION AND TEMPLATE REMOVAL METHOD

(75) Inventors: John L. Falconer, Boulder, CO (US); Richard D. Noble, Boulder, CO (US); Begum Tokay, Istanbul (TR); Yanfeng Zhang, Shanghai (CN)

(73) Assignee: The Regents of the University of Colorado, Denver, CO (US)

( * ) Notice: Subject to any disclaimer, the term of this patent is extended or adjusted under 35 U.S.C. 154(b) by 261 days.

(21) Appl. No.: 13/096,225

(22) Filed: Apr. 28, 2011

(65) Prior Publication Data

US 2012/0006194 A1 Jan. 12, 2012

Related U.S. Application Data

(60) Provisional application No. 61/329,444, filed on Apr. 29, 2010.

(51) Int. Cl.
*B01D 53/22* (2006.01)
*B01D 71/02* (2006.01)
*B05D 3/02* (2006.01)

(52) U.S. Cl.
USPC .......... 95/51; 95/45; 96/4; 96/11; 502/4; 427/226; 427/397.7

(58) Field of Classification Search
USPC ....... 95/45, 51; 96/4, 11; 502/4, 62; 427/226, 427/246, 430.1, 372.2, 397.7
See application file for complete search history.

(56) References Cited

U.S. PATENT DOCUMENTS

| | | |
|---|---|---|
| 3,404,086 A | 10/1968 | Plank et al. |
| 3,644,200 A | 2/1972 | Young |
| 4,414,005 A | 11/1983 | De Bievre et al. |
| 4,440,871 A | 4/1984 | Lok et al. |
| 4,775,396 A | 10/1988 | Rastelli et al. |

(Continued)

FOREIGN PATENT DOCUMENTS

| | | |
|---|---|---|
| CN | 1106715 | 8/1995 |
| CN | 1167005 A | 12/1997 |

(Continued)

OTHER PUBLICATIONS

Kanazirew, Vladislav et al., "The Effect of O2 on the Thermal Activation of Zeolite Beta", 1996, Journal of Catalysis, 161, pp. 156-163.*

(Continued)

*Primary Examiner* — Jason M Greene
(74) *Attorney, Agent, or Firm* — Lathrop & Gage LLP

(57) ABSTRACT

The present invention provides methods for making improved zeolite and crystalline silicoaluminophosphate (SAPO) membranes, in particular SAPO-34 membranes, on a porous support through improved removal of the organic structure-directing templating agent. A calcining step is performed in an oxygen free atmosphere, such as under a vacuum or inert gas, to remove the organic templating agent. By removing the templating agent in the absence of oxygen, the calcination step can remove a greater amount of the templating agent than comparable template removal steps conducted in the presence of oxygen and the calcination step can be conducted at significantly lower temperatures. The membranes of the present invention provide increased permeance while maintaining comparable selectivity for gas separations, particularly carbon dioxide ($CO_2$) and methane ($CH_4$) separations and separations at high temperatures.

35 Claims, 5 Drawing Sheets

(56) References Cited

U.S. PATENT DOCUMENTS

| | | | |
|---|---|---|---|
| 5,100,596 A | 3/1992 | Haag et al. | |
| 5,110,478 A * | 5/1992 | Haag et al. | 95/50 |
| 5,143,876 A | 9/1992 | Chang et al. | |
| 5,248,647 A | 9/1993 | Barger | |
| 5,296,208 A | 3/1994 | Lesch | |
| 5,362,522 A | 11/1994 | Barri et al. | |
| 5,464,798 A | 11/1995 | Jia et al. | |
| 5,552,132 A * | 9/1996 | Evans | 423/701 |
| 5,557,030 A | 9/1996 | Markovs et al. | |
| 5,567,664 A | 10/1996 | Barri et al. | |
| 5,605,631 A | 2/1997 | Barri et al. | |
| 5,716,527 A | 2/1998 | Deckman et al. | |
| 5,779,904 A | 7/1998 | Ruderman et al. | |
| 5,785,947 A | 7/1998 | Zones et al. | |
| 5,824,617 A | 10/1998 | Lai | |
| 5,830,429 A | 11/1998 | Balkus et al. | |
| 5,871,650 A | 2/1999 | Lai et al. | |
| 5,935,440 A | 8/1999 | Bratton et al. | |
| 6,051,745 A | 4/2000 | Wu et al. | |
| 6,051,746 A | 4/2000 | Sun et al. | |
| 6,074,457 A | 6/2000 | Anthonis et al. | |
| 6,090,289 A | 7/2000 | Verduijn et al. | |
| 6,140,263 A | 10/2000 | Anstett et al. | |
| 6,177,373 B1 | 1/2001 | Sterte et al. | |
| 6,193,784 B1 | 2/2001 | Yazawa et al. | |
| 6,472,016 B1 | 10/2002 | Soria et al. | |
| 6,503,294 B2 | 1/2003 | Yoshikawa et al. | |
| 6,514,899 B1 | 2/2003 | Mertens et al. | |
| 6,660,682 B2 | 12/2003 | Cao et al. | |
| 6,696,032 B2 | 2/2004 | Mertens et al. | |
| 6,756,516 B2 | 6/2004 | Mees et al. | |
| 6,767,384 B1 | 7/2004 | Vu et al. | |
| 6,897,180 B2 | 5/2005 | Mees et al. | |
| 6,903,240 B2 | 6/2005 | Mertens et al. | |
| 7,011,810 B2 | 3/2006 | Dakka et al. | |
| 7,014,587 B2 | 3/2006 | Grundl et al. | |
| 7,014,827 B2 | 3/2006 | Mertens et al. | |
| 7,037,360 B2 * | 5/2006 | Inagaki et al. | 96/126 |
| 7,087,794 B2 | 8/2006 | Risch et al. | |
| 7,316,727 B2 * | 1/2008 | Falconer et al. | 95/51 |
| 7,828,875 B2 | 11/2010 | Li et al. | |
| 2003/0149321 A1 | 8/2003 | Mees et al. | |
| 2003/0220188 A1 | 11/2003 | Marand | |
| 2004/0215044 A1 | 10/2004 | Mertens et al. | |
| 2005/0003956 A1 | 1/2005 | Fuglerud et al. | |
| 2005/0171394 A1 | 8/2005 | Fuglerud et al. | |
| 2005/0204916 A1 | 9/2005 | Falconer et al. | |
| 2006/0079725 A1 | 4/2006 | Li et al. | |
| 2006/0252631 A1 | 11/2006 | Deckman et al. | |
| 2006/0292053 A1 | 12/2006 | Mertens et al. | |
| 2007/0265484 A1 | 11/2007 | Li et al. | |
| 2008/0156700 A1 * | 7/2008 | Abulnaga et al. | 208/251 R |
| 2008/0216650 A1 * | 9/2008 | Falconer et al. | 95/51 |
| 2010/0102001 A1 | 4/2010 | Falconer et al. | |
| 2010/0116130 A1 | 5/2010 | Carreon et al. | |
| 2012/0272826 A1 * | 11/2012 | Uchikawa et al. | 96/8 |
| 2013/0280430 A1 * | 10/2013 | Ramachandran et al. | 427/397.7 |

FOREIGN PATENT DOCUMENTS

| | | |
|---|---|---|
| JP | 2001-146416 A | 5/2001 |
| RU | 2174044 | 9/2001 |
| RU | 2179064 | 2/2002 |
| RU | 2183499 | 6/2002 |
| WO | 94/25151 | 11/1994 |
| WO | 97/25129 | 7/1997 |
| WO | 97/33684 | 9/1997 |
| WO | 97/37752 | 10/1997 |
| WO | 2000/06493 | 2/2000 |
| WO | 2000/25152 | 5/2000 |
| WO | 2002/074421 | 9/2002 |
| WO | 2003/048042 | 6/2003 |
| WO | 2004/096709 | 11/2004 |
| WO | 2007/134094 | 11/2007 |
| WO | 2008/112520 | 9/2008 |

OTHER PUBLICATIONS

Australian Patent Office Search Report Corresponding to Application No. SG 200808108-5, Mailed Dec. 1, 2009, 1 page.

Eurasian Search Report Corresponding to Russian Application No. 200802326, Mailed Dec. 9, 2009, 1 page.

PCT Search Report, dated Jul. 13, 2011, corresponding to International Application No. PCT/US11/34292 (filed Apr. 28, 2011), parent of the present application, 2 pp.

Ahn et al. (Aug. 1, 2006) "Pervaporation of Dichlorinated Organic Compounds Through Silicalite-1 Zeolite Membrane," J. Membr. Sci. 279(1-2):459-465.

Aoki et al. (1998) "Gas Permeation Properties of A-Type Zeolite Membrane Formed on Porous Substrate by Hydrothermal Synthesis," J. Membrane Sci. 141:197-205.

Avila et al. (2009) "Concentration Polarization in SAPO-34 Membranes at High Pressures," J. Membr. Sci. 335:32-36.

Baerlocher et al. (2001) *Atlas of Zeolite Framework Types*, 5$^{th}$ ed., Elsevier, Amsterdam <www>.iza-structure.org/databases/, 1442, 1464, 38117.

Bakker et al. (1996) "Permeation Characteristics of a Metal-Supported Silicalite-1 Zeolite Membrane," J. Membrane Sci. 117:57-78.

Bernal et al. (2001) "Tubular MFI Zeolite Membranes Made by Secondary (Seeded) Growth," Catal. Today 67:101-107.

Bourgeat-Lami et al. (1992) "Mechanism of the Thermal Decomposition of Tetraethylammonium in Zeolite β," J. Phys. Chem. 96:3807-3811.

Bowen et al. (2004) "Fundamentals and Applications of Pervaporation Through Zeolite Membranes," J. Membr. Sci. 245:1-33.

Breck, D.W. (1974) *Zeolite Molecular Sieves*, Krieger Publishing Company. Malabar, Florida, pp. 460-465, 498-503, 570-573.

Buchholz et al. (2004) "Sequential Steps of Ammoniation of the Microporous Silicoaluminophosphates H-SAPO-34 and H-SAPO-37 Investigated by In Situ CF MAS NMR Spectroscopy," J. Phys. Chem. B 108(10):3107-3113.

Camblor et al. (1998) Synthesis and Structural Characterization of MWW Type Zeolite ITQ-1, the Pure Silica Analog of MCM-22 and SSZ-25 J. Phys. Chem. B 102(1):44-51.

Caro et al. (2000) "Zeolite Membranes—State of Their Development and Perspective," Microporous Mesoporous Mater 38:3-24.

Carreon et al. (2008) "Alumina-Supported SAPO-34 Membranes for $CO_2/CH_4$ Separation," J. Am. Chem. Soc. 130:5412-5413 (plus Supporting Information).

Carreon et al. (2008) "SAPO-34 Seeds and Membranes Prepared Using Multiple Structure Directing Agents," Adv. Mater. 20:729-732 (plus Supporting Information).

Choi et al. (2009) "Grain Boundary Defect Elimination in a Zeolite Membrane by Rapid Thermal Processing," Science, 325:590-593.

Choung et al. (1999) "Role of Complexing Agents in Ferrite Formation Under Ambient Conditions," Ind. Eng. Chem. Res. 38:4689-4693.

Dong et al. (2000) "Template-Removal-Associated Microstructural Development of Porous-Ceramic-Supported MFI Zeolite Membranes," Microporous Mesoporous Mater. 34:241-253.

Dyer, A. (1988) *An Introduction to Zeolite Molecular Sieves*, John Wiley and Sons, New York, pp. 1-3,12-15,20-25,36-37,54,57,118-124.

Flanigen et al. (1986) "Aluminophosphate Molecular Sieves and the Periodic Table," Pure Appl. Chem. 58(10):1351-1358.

Geus et al. (1992) "Synthesis and Characterization of Zeolite (MFI) Membranes on Porous Ceramic Supports," J. Chem. Soc. Faraday Trans. 88:3101-3109.

Gopalakrishnan et al. (2006) "Permeation Properties of Templated and Template-Free ZSM-5 Membranes," J. Membr. Sci. 274:102-107.

Gualtieri et al. (2006) "The Influence of Heating Rate on Template Removal in Silicalite-1: An In Situ HT-XRPD Study," Microporous Mesoporous Mater. 89:1-8.

(56) References Cited

OTHER PUBLICATIONS

Gualtieri et al. (2007) "Crack Formation in α-Alumina Supported MFI Zeolite Membranes Studied by In Situ High Temperature Synchrotron Powder Diffraction," J. Membr. Sci. 290:95-104.
Guan et al. (2002) "Separation of Nitrogen From Oxygen Using A Titanosilicate Membrane Prepared on a Porous α-Alumina Support Tube," Sep. Sci. Technol. 37(5):1031-1039.
Gump et al. (2001) "Aromatic Permeation Through Crystalline Molecular Sieve Membranes," Ind. Engr. Chem. Res. 40(2):565-577.
Ha et al. (2000) "Facile Assembly of Zeolite Monolayers on Glass, Silica, Alumina, and Other Zeolites Using 3-Halopropylsily Reagents as Covalent Linkers," Adv. Mater. 12(15):1114-1117.
Hedlund et al. (1999) "ZSM-5 Membranes Synthesized Without Organic Templates Using a Seeding Technique," J. Membr. Sci. 159:263-273.
Hedlund et al. (2002) "High-Flux MFI Membranes," Micro. Meso. Mater. 52:179-189.
Hedlund et al. (2003) "A Masking Technique for High Quality MFI Membranes," J. Membr. Sci. 222:163-179.
Heng et al. (2004) "Low-Temperature Ozone Treatment for Organic Template removal from Zeolite Membrane," J. Membr. Sci., 243:69-78.
Hong et al. (2007) "Ion-Exchanged SAPO-34 Membranes for Light Gas Separations," Microporous Mesoporous Mater. 106:140-146.
Huang et al. (2004) "Synthesis and Properties of A-Type Zeolite Membranes by Secondary Growth Method with Vacuum Seeding," J. Membr. Sci. 245:41-51.
Jafar et al. (1997) "Separation of Alcohol/Water Mixtures by Pervaporation Through Zeolite A Membranes," Microporous Mater. 12:305-311.
Jhung et al. (2003) "Selective Formation of SAPO-5 and SAPO-34 Molecular Sieves with Microwave Irradiation and Hydrothermal Heating," Micro. Meso. Mater. 64:33-39.
Jia et al. (1993) "Ceramic Zeolite Composite Membranes," J. Membr. Sci. 82:15-26.
Jones et al. (2001) "Tailoring Molecular Sieve Properties During SDA Removal Via Solvent Extraction," Micropor. Mesopor. Mater. 48:57-64.
Kanazirev et al. (1996) "The Effect of $O_2$ on the Thermal Activation of Zeolite Beta," J. Catal. 161:156-163.
Kang et al. (2002) "Intrapore Synthesis of Silicalite Membranes at Temperatures Below 100° C," Ind. Eng. Chem. Res. 41:3145-3150.
Kärger et al. (1992) *Diffusion in Zeolites and Other Microporous Solids*, John Wiley and Sons, New York, pp. 9-10.
Keizer et al. (1998) "Two Component Permeation Through Thin Zeolite MFI Membranes," J. Memb. Sci. 147:159-172.
Kita et al. (1995) "Synthesis of a Zeolite NaA Membrane for Pervaporation of Water/Organic Liquid Mixtures," J. Mater. Sci. Lett. 14:206-208.
Kita et al. (2001) "Preparation of Faujasite Membranes and Their Permeation Properties," Sep. Purif. Technol. 25:261-268.
Kondo et al. (1997) "Tubular-Type Pervaporation Module with Zeolite NaA Membrane," J. Membr. Sci. 133:133-141.
Kuhn et al. (2009) "Performance and Stability of Multi-Channel MFI Zeolite Membranes Detemplated by Calcination and Ozonication in Ethanol/Water Pervaporation," J. Membr. Sci., 339:261-274.
Kusakabe et al. (1997) "Formation of a Y-Type Membrane on a Porous α-Alumina Tube for Gas Separation," Ind. Eng. Chem. Res. 36:649-655.
Lai et al. (1998) "Surface Seeding in ZSM-5 Membrane Preparation," Ind. Eng. Chem. Res. 37:4275-4283.
Lai et al. (2003) "Microstructural Optimization of a Zeolite Membrane for Organic Vapor Separation," Science 300:456-460.
Lai et al. (2004) "Siliceous ZSM-5 Membranes by Secondary Growth of b-Oriented Seed Layers," Adv. Funct. Mater. 14(7):716-729.
Li et al. (2001) "Pervaporation of Water/THF Mixtures Using Zeolite Membranes," Ind. Eng. Chem. Res. 40:4577-4585.

Li et al. (2002) "ZSM-11 Membranes: Characterization and Pervaporation Performance for Alcohol/Water Mixtures." AIChE J. 48(2):269-278.
Li et al. (2003) "The control of phase and orientation in zeolite membranes by the secondary growth method," Microporous Mater. 62:211-220.
Li et al. (2004) "SAPO-34 Membranes for $CO_2/CH_4$ Separation," J. Memb. Sci. 241:121-135.
Li et al. (2005) "Effects of Impurities on $CO_2/CH_4$ Separations Through SAPO-34 Membranes," J. Membr. Sci. 251:59-66.
Li et al. (2005) "High-Pressure $CO_2/CH_4$ Separation Using SAPO-34 Membranes," Ind. Eng. Chem. Res. 44(9):3220-3228.
Li et al. (Oct. 2006) "Improved SAPO-34 Membranes for CO2/CH4 Separations," Adv. Mater. 18(19):2601-2603.
Li et al. (2008) "SAPO-34 Membranes for CO2/CH4 Separations: Effect of Si/Al Ratio," Microporous Mesoporous Mater. 110:310-317.
Li et al. (Web Release Feb. 1, 2010) "Scale-Up of SAPO-34 Membranes for $CO_2/CH_4$ Separation," J. Membr. Sci. 352(1-2):7-13.
Lin et al. (2000) "A Novel Method for the Synthesis of High Performance Silicalite Membranes," Chem. Commun., p. 1889-1890.
Lin et al. (2001) "Silicalite Membrane Preparation, Characterization, and Separation Performance," Ind. Eng. Chem. Res. 40:4069-4078.
Lixiong et al. (1997) "Synthesis of SAPO-34/Ceramic Composite Membranes," Stud. Surf. Sci. Catl. 105:2211-2215,.
Mabande et al. (Web Release Oct. 26, 2005) "Preparation of b-Oriented MFI Films on Porous Stainless Steel Substrates," Ind. Eng. Chem. Res. 44(24):9086-9095,.
Masuda et al. (1994) "Preparation of a Dense ZSM-5 Zeolite Film on the Outer of an Alumina Ceramic Filter," Appl. Catal. 111:143-150.
Masuda et al. (1995) "Preparation of an A-Type Zeolite Film on the Surface of an Alumina Ceramic Filter," Microporous Mat. 3:565-571.
Matsukata et al. (1997) "Zeolitic Membranes: Synthesis, Properties, and Prospects," Bull. Chem. Soc. Jpn. 70(10):2341-2356.
Mees et al. (2002) "Electronic Supplementary Information (ESI) on the Synthesis Procedure," Supp. Material for Chem. Commun.
Mees et al. (2003) "Improvement of the Hydrothermal Stability of SAPO-34," Chem. Commun. 1:44-45.
Meriaudeau et al. (1997) "SAPO-11, SAPO-31, and SAPO-41 Molecular Sieves: Synthesis, Characterization, and Catalytic Properties in n-Octane Hydroisomerization," J. Catalysis 169:55-66.
Morigami et al. (2001) "The First Large-Scale Pervaporation Plant Using Tubular-Type Module with Zeolite NaA Membrane," Sep. Purif. Technol. 25:251-260.
Motuzas et al. (2007) "Ultra-Rapid Production of MFI Membranes by Coupling Microwave-Assisted Synthesis with Either Ozone or Calcination Treatment," Microporous and Mesoporous Mater. 99:197-205.
Nikolakis et al. (2001) "Growth of a Faujasite-Type Zeolite Membrane and Its Application in the Separation of Saturated/Unsaturated Hydrocarbon Mixtures," J. Membr. Sci. 184:209-219.
Nishiyama et al. (1995) "A Defect-Free Mordenite Membrane Synthesized by Vapour-Phase Transport Method," J. Chem. Soc. Chem. Commun. 1967-1968.
Noble et al. (2000) "$CO_2$ Separation Using Zeolite Membranes," *Proceedings of Coal Research Contractors Review Meeting*, Jun. 6-7, 2000, <www.netl.doe.gov/publications/proceedings/00/ucr00/noble.pdf>, Accessed Jun. 17, 2010.
Okamoto et al. (2001) "Zeolite NaA Membrane: Preparation, Single-Gas Permeation, and Pervaporation and Vapor Permeation of Water/Organic Liquid Mixtures," Ind. Eng. Chem. Res. 40(1):163-175.
Pan et al. (2001) "Template-Free Secondary Growth Synthesis of MFI Type Zeolite Membranes," Microporous Mesoporous Mater. 43:319-327.
Parikh et al. (2004) "Non-Thermal Calcination by Ultraviolet Irradiation in the Synthesis of Microporous Materials," Microporous and Mesoporous Mater. 76:17-22.
Pina et al. (2004) "A Semi-Continuous Method for the Synthesis of NaA Zeolite Membranes on Tubular Supports," J. Membr. Sci. 244:141-150.
Poshusta et al. (1998) "Synthesis and Permeation Properties of SAPO-34 Tubular Membranes," Ind. Eng. Chem. Res. 37:3924-3929.

(56) References Cited

OTHER PUBLICATIONS

Poshusta et al. (1999) "Temperature and Pressure Effects on $CO_2$ and $CH_4$ Permeation Through MFI Zeolite Membranes," J. Membr. Sci. 160:115-125.
Poshusta et al. (Apr. 2000) "Separation of Light Gas Mixtures Using SAPO-34 Membranes," AIChE Journal 46(4):779-789.
Poshusta et al. (2000) "Separation of Light Gas Mixtures Using SAPO-34 Membranes," AIChe J. 46(4):779-789.
Poshusta et al. (2001) "Characterization of SAPO-34 Membranes by Water Absorption," J. Membr. Sci. 186:25-40.
Prakash et al. (1994) "Synthesis of SAPO-34: High Silicon Incorporation in the Presence of Morpholine as Template," J. Chem. Soc. Faraday Trans. 90(15):2291-2296.
Prakash, A.M. "Recipe for SAPO-34," <www.iza-synthesis.org/Recipies/SAPO-34.html>, Accessed Jan. 15, 2004.
Robeson, L.M. (Oct. 1, 1991) "Correlation of Separation Factor Versus Permeability for Polymeric Membranes," J. Membr. Sci. 62(2):165-185.
Sano et al. (1992) "Synthesis and Characterization of Polycrystalline SAPO-5 Film," J. Mol. Cat. 77:L19-L26.
Sato et al. (2007) "A High Reproducible Fabrication Method for Industrial Production of High Flux NaA Zeolite Membrane," J. Membr. Sci. 301:151-161.
Sherman, J.D. (1999) "Synthetic Zeolites and Other Microporous Oxide Molecular Sieves," Proc. Natl. Acad. Sci. USA 96:3471-3478.
Singh et al. (2003) In; *Handbook of Zeolite Science and Technology*, Auerbach et al Eds., Marcel Dekker, Inc., New York, pp. 27-31.
Szostak, R. (1998) "Synthesis of Molecular Sieve Phosphates," In, "Recent Advances in the Understanding of Zeolite Synthesis," in, *Molecular Sieves, Science and Technology*, Karge et al. Eds., Springer-Verlag, Berlin pp. 161-165.
Tavolaro et al. (2000) "Synthesis and Characterization of a Mordenite Membrane on an $\alpha$-$Al_2O_3$ Tubular Support," J. Mater. Chem. 10:1131-1137.
Thompson, R.W. (1998) "Recent Advances in the Understanding of Zeolite Synthesis," in, *Molecular Sieves, Science and Technology*, Karge et al. Eds., Springer-Verlag, Berlin, pp. 1-33.
Tomita et al. (2004) "Gas Separation Characteristics of DDR Type Zeolite Membrane," Micropor. Mesopor. Mater. 68:71-75.
Tsai et al. (1998) "Well-Aligned SAPO-5 Membrane: Preparation and Characterization," Micropor. Mesopor. Mat. 22:333-341.
Tuan et al. (2002) "Separating Organics From Water by Pervaporation with Isomorphously-Substituted MFI Zeolite Membranes," Mem. Sci. 196:111-123.
Van Den Berg et al. (2003) "Zeolite A Membranes Synthesized on a UV-Irradiated $TiO_2$ Coated Metal Support: the High Pervaporation Performance," J. Membr. Sci. 224:29-37.
Van Den Broeke et al. (1999) "Transport and Separation Properties of a Silicalite-1 Membrane, I. Operating Conditions," Chem. Eng. Sci. 54:245-258.
Van Heyden et al. (2008) "Nanosized SAPO-34 Synthesized from Colloidal Solutions," Chem. Mater., 20(9):2956-2963.
Vomscheid et al. (1995) "Reversible Interaction of $NH_3$ with the Framework of Template-Free Zeolite-Type SAPO-34," J. Chem. Soc. Faraday Trans. 91(18):3281-3284.
Wegner et al. (1999) "Polycrystalline MFI Zeolite Membranes: Xylene Pervaporation and its Implication on Membrane Microstructure," J. Membr. Sci. 158:17-27.
Weh et al. (2002) "Change of Gas Permeation by Photoinduced Switching of Zeolite-Azobenzene Membranes of Type MFI and FAU," Micropor. Mesopor. Mater. 54:15-26.
Weh et al. (2002) "Permeation of Single Gases and Gas Mixtures Through Faujasite-Type Molecular Sieve Membranes," Micropor. Mesopor. Mater. 54:27-36.
Wilson, S.T. (2001) "Templating in Molecular Sieve Synthesis," In; *Verified Synthesis of Zeolitic Materials*, Robson, H. Ed., Elsevier, 27-31.
Wong et al. (2001) "Effect of Synthesis Parameters on the Zeolite Membrane Morphololgy," J. Membr. Sci. 193:141-161.
Woodcock et al. (1999) "Negative Thermal Expansion in the Siliceous Zeolites Chabazite and ITQ-4: A Neutron Powder Diffraction Study," Chem. Mater. 11(9):2508-2514.
Xomeritakis et al. (2000) "Transport Properties of Alumina-Supported MFI Membranes Made by Secondary (Seeded) Growth," Micropor. Mesopor. Mater. 38:61-73.
Yan et al. (1995) "Zeolite ZSM-5 Membranes Grown on Porous $\alpha$-$Al_2O_3$," JCS Chem. Commun. 2:227-228.
Zhang et al. (2002) "Synthesis of Small Crystal Polycrystalline Mordenite Membrane," J. Membr. Sci. 210:361-368.
Zecchina et al. (1997) "Vibrational Spectroscopy of $NH_4+$ Ions in Zeolitic Materials: An IF Study," J. Phys. Chem. B 101:10128-10135.
Zhong et al. (2009) "Microwave Synthesis of MFI-Type Zeolite Membranes by Seeded Secondary Growth Without the Use of Organic Structure Directing Agents," Microporous Mesoporous Mater. 118:224-231.
Zhu et al. (1999) "Shape Selectivity in the Adsorption of Propane/Propene on the All-Silica DD3r," Chem. Commun. 2453-2454.
Zones et al. (2002) Synthesis of High Silica Zeolites Using a Mixed Quaternary Ammonium Cation, Amine Approach: Discovery of Zeolite SSZ-47 Chem. Mater. 14(1):313-320.
Zones et al. (2001) "Studies of the Synthesis of SSZ-25 Zeolite in 'Mixed-Template' System," Chem. Eur. J. 7(9):1990-2001.
Sano et al. (1992) "Separation of Ethanol/Water Mixture by Silicalite Membrane," Chem. Lett., pp. 2413-2414.

\* cited by examiner ns i and j, a separation selectivity $S_{i/j}$ greater than one
HIGH FLUX SAPO-34 MEMBRANES FOR $CO_2/CH_4$ SEPARATION AND TEMPLATE REMOVAL METHOD

CROSS REFERENCE TO RELATED APPLICATIONS

This application claims priority to U.S. Provisional Application Ser. No. 61/329,444, filed Apr. 29, 2010, which is hereby incorporated by reference in its entirety to the extent not inconsistent with the disclosure herewith.

BACKGROUND OF THE INVENTION

This invention is in the field of zeolite and silicoaluminophosphate (SAPO) membranes, in particular SAPO-34 membranes, prepared using organic templating agents. The invention provides improved supported SAPO membranes as well as methods for making and using such membranes.

In the past two decades, extensive research has been devoted to SAPO and other zeolite membranes because they have higher thermal and chemical properties compared with those of polymer membranes. Many types of zeolite membranes have been studied such as MFI, LTA, MOR, and FAU-type membranes. (See Sano et al, Chem. Lett. 12 (1992), p. 2413; Bakker et al, J. Membr. Sci. 117 (1996), p. 57; Lai et al, Ind. Eng. Chem. Res. 37 (1998), p. 4275; Liu et al, Chem. Commun. (2000), p. 1889; Bernal et al, Catal. Today 67 (2001), p. 101; Hedlund et al, J. Membr. Sci. 52 (2002), p. 179; Lai et al, Science 300 (2003), p. 456; Li et al, Ind. Eng. Chem. Res. 40 (2001), p. 4577; Kita et al, J. Mater. Sci. Lett. 14 (1995), p. 206; Kondo et al, J. Membr. Sci. 133 (1997), p. 133; Jafar and Budd, Microporous Mater. 12 (1997), p. 305; Aoki et al, J. Membr. Sci 141 (1998), p. 197; Kumakiri et al, Ind. Eng. Chem. Res. 38 (1999), p. 4689; Okamoto et al, Ind. Eng. Chem. Res. 40 (2001), p. 163; Morigami et al, Sep. Purif. Technol. 25 (2001), p. 251; Van den Berg et al, J. Membr. Sci. 224 (2003), p. 29; Pina et al, J. Membr. Sci. 244 (2004), p. 141; Huang et al, J. Membr. Sci. 245 (2004), p. 41; Sato et al, J. Membr. Sci. 301 (2007), p. 151; Nishiyama et al, J. Chem. Soc. Chem. Commun. (1995), p. 1967; Tavolaro et al, J. Mater. Chem. 10 (2000), p. 1131; Zhang et al, J. Membr. Sci. 210 (2002), p. 361; Li et al, Microporous Mater. 62 (2003), p. 211; Nikolakis et al, J. Membr. Sci. 184 (2001), p. 209; Kita et al, Sep. Purif. Technol. 25 (2001), p. 261; Matsukata and Kikuchi, Bull. Chem. Soc. Jpn. 70 (1997), p. 2341; Caro et al, Microporous Mesoporous Mater. 38 (2000), p. 3; and Bowen et al, J. Membr. Sci. 245 (2004), p. 1).

SAPO membranes have great potential in chemical and petrochemical industries for large scale separations, such as natural gas sweetening and carbon dioxide ($CO_2$) sequestration. For these applications, important parameters are the permeance (the degree to which the membrane admits a flow of a particular gas through the membrane) and the separation selectivity provided by the membrane. For two gas components i and j, a separation selectivity $S_{i/j}$ greater than one implies that the membrane is selectively permeable to component i. If a feedstream containing both components is applied to one side of the membrane, the permeate stream exiting the other side of the membrane will be enriched in component i and depleted in component j. The greater the separation selectivity, the greater the enrichment of the permeate stream in component i.

Carbon dioxide/methane ($CO_2/CH_4$) separation is important for natural gas processing because $CO_2$, which is a contaminant in natural gas wells, decreases the energy content of the gas, and is acidic and corrosive in the presence of water. It has been reported that SAPO-34 membranes have high $CO_2/CH_4$ separation selectivities, but that the selectivities decrease as the feed pressure increases because at higher feed pressures a larger fraction of the gas flow is through defects in the membrane and $CO_2$ loading is closer to saturation loading than $CH_4$ (Li et al., Ind. Eng. Chem. Res., 44 (2005) p. 3220; Carreon et al., J. Am. Chem. Soc., 130 (2008) p. 5412). Because natural gas wells are at high pressures, the gas separation also needs to be done at high pressure and $CO_2$ needs to be removed while keeping $CH_4$ at high pressure. Accordingly, it is desirable to produce SAPO and other zeolite membranes having high permeance and separation selectivities, particularly $CO_2$ permeance and $CO_2/CH_4$ separation selectivities, at high pressure.

SAPO crystals can be synthesized by hydrothermal crystallization from a reaction mixture containing reactive sources of silica, alumina, and phosphate, and an organic templating agent. Lok et al. (U.S. Pat. No. 4,440,871) report gel compositions and procedures for forming several types of SAPO crystals, including SAPO-5, SAPO-11, SAPO-16, SAPO-17, SAPO-20, SAPO-31, SAPO-34, SAPO-35, SAPO-37, SAPO-40, SAPO 41, SAPO-42, and SAPO-44 crystals. Similarly, Prakash and Unnikrishnan report gel compositions and procedures for forming SAPO-34 crystals. (Prakash and Unnikrishnan, J. Chem. Sc. Faraday Trans., 90(15) (1994), p. 2291-2296). In several of Prakash and Unnikrishnan's reported procedures, the gel was aged for 24 hours at 27° C. (300 K).

Lixiong et al. (Stud. Surf. Sci. Catl.; 105 (1997), p 2211) reported synthesis of a SAPO-34 membrane on one side of a porous $\alpha$-$Al_2O_3$ disk by immersing the substrate surface in a hydrogel and heating the substrate and gel. Lixiong et al. reported single gas permeances for $H_2$, $N_2$, $CO_2$, and n-$C_4H_{10}$. Poshuta et al. (Ind. Eng. Chem. Res., 37 (1998), p. 3924-3929; and AIChE Journal, 46(4) (2000) p. 779-789) reported hydrothermal synthesis of SAPO-34 membranes on the inside surface of asymmetric, porous $\alpha$-$Al_2O_3$ tubes. Poshuta et al. reported single gas and mixture permeances and ideal and mixture selectivities for several gases, including $CO_2$ and $CH_4$. The $CO_2/CH_4$ selectivities reported for a 50/50 $CO_2/CH_4$ mixture at 300K were between 14 and 36 for a feed pressure of 270 kPa and a pressure drop of 138 kPa (Poshusta et al, AlChE Journal, 46(4) (2000) pp 779-789). The $CO_2/CH_4$ selectivity was attributed to both competitive adsorption (at lower temperatures) and differences in diffusivity. Li et al. reported an average $CO_2/CH_4$ selectivity of 76+/−19 for a 50/50 $CO_2/CH_4$ mixture at 295 K with a feed pressure of 222 kPa and a pressure drop of 138 kPa. The average $CO_2$ permeance was $(2.3+/-0.2) \times 10^{-7}$ mol/(m²sPa) and the average $CH_4$ permeance was $(3.1+/-0.8) \times 10^{-9}$ mol/(m²sPa) (Li et al, Ind. Eng. Chem. Res. 44 (2005), 3220-3228) U.S. Pat. No. 7,316,727 to Falconer et al. reports $CO_2/CH_4$ separation selectivities of 67-93 for a 50/50 $CO_2/CH_4$ mixture at 297 K with a feed pressure of 222 kPa and a pressure drop of 138 kPa. Improved supported SAPO-34 membranes as well as methods for making them have further been disclosed in U.S. Pat. No. 7,828,875 (Li et al.); and U.S. Published Applications 2007-0265484-A1 (Li et al.) and 2008-0216650-A1 (Falconer et al.).

The SAPO-34 membrane permeance and selectivity can be affected by Si/Al ratios, seed size, template types, membrane thickness, cation forms, $CO_2/CH_4$ feed ratio and support properties (Li et al., Microporous Mesoporous Mater., 110 (2008) p. 310; Li et al. Adv. Mater., 18 (2006) p. 2601; Carreon et al., Adv. Mater., 20 (2006) p. 729; Hong et al., Microporous Mesoporous Mater., 106 (2007) p. 140; Li et al., J. Membr. Sci., 241 (2004) p. 121). Also, at high pressures both selectivity and permeance can be decreased by concentration polarization, although using a Teflon insert in a membrane tube has been used to minimize polarization (Avila et al., J. Membr. Sci., 335 (2009) p. 32).

Transport of gases through a crystalline molecular sieve membrane can also be influenced by any "non-zeolite pores" in the membrane structure. The contribution of non-zeolite pores to the flux of gas through a zeolite-type membrane depends on the number, size and selectivity of these pores. For polycrystalline molecular sieve membranes, some flow is expected through intercrystalline regions. If the non-zeolite pores are sufficiently large, transport through the membrane can occur through Knudsen diffusion or viscous flow. For MFI zeolite membranes, it has been reported that non-zeolite pores that allow viscous and Knudsen flow decrease the selectivity (Poshusta, J. C. et al., 1999, "Temperature and Pressure Effects on $CO_2$ and $CH_4$ permeation through MFI Zeolite membranes," J. Membr. Sci., 160, 115).

Both permeance and selectivity for zeolite membranes can also be affected by the conditions used for organic template removal. Typically, zeolite membranes are prepared by contacting a membrane forming gel, which generally comprises $Al_2O_3$, $P_2O_5$, $SiO_2$, $H_2O$ and an organic template, with a porous support and heating for several hours at temperatures in excess of 420 K. After hydrothermal synthesis, the membranes are typically washed, dried and calcined to remove the organic template.

In previous studies, the organic templating agent was removed from SAPO-34 membranes by heating the membrane in stagnant air (calcination) at 673 K with slow heating and cooling rates. Li et al. reported that the highest selectivities for SAPO-34 membranes were found for a calcination temperature of 663 K, and selectivities significantly decreased at temperatures above 673 K (J. Membr. Sci., 241 (2004) p. 121). Studies on MFI membranes reported that the thermal expansion mismatch between the zeolite film and the support can generate thermal stress and cracks in the membranes during template removal resulting in reduced performance (Gualtieri et al., J. Membr. Sci., 290 (2007) p. 95; Hedlund et al., J. Membr. Sci., 222 (2003) p. 163; Lai et al., Adv. Funct. Mater., 14 (2004) p. 716). In addition, intercrystalline pores may enlarge during template removal from the MFI structure because contraction of the zeolite unit cell causes tensile stress in the membrane layer (Dong et al., Microporous Mesoporous Mater., 34 (2000) p. 241). Woodcock et al. reported that chabazite, which has a similar structure as SAPO-34, was one of the most strongly contracting materials known, with a linear expansion coefficient varying from $-0.5 \times 10^{-6}$ to $-16.7 \times 10^{-6}$ $K^{-1}$, and the unit cell volume decreased 1.5% from 293 to 873 K (Chem. Mater., 11 (1999) p. 2508). Therefore, the heating and cooling rates as well as the overall temperature during template removal affect pore size and the amount of defects in the resulting zeolite membrane and therefore can also affect the separation properties of the resulting membrane.

Although Gualtieri et al. concluded the residual stress in MFI films during calcination was independent of heating rate (Microporous Mesoporous Mater., 89 (2006) p. 1), the heating rate used during template removal has been shown to specifically affect membrane properties. Choi et al. showed that heating MFI membranes to 973 K in only 1 minute, prior to conventional calcination for 10 hours at 753 K (heating ramp of 0.5 K/min), significantly improved hydrocarbon separations at elevated temperatures (Science, 325 (2009) p. 590). They concluded that chemical bonds formed between the zeolite crystals during the rapid heating and these bonds minimized cracking during the slow calcination.

MFI membranes have also been prepared by template-free synthesis to minimize defect formation. Eliminating high-temperature calcination yielded membranes with higher separation selectivities (Pan and Lin, Microporous Mesoporous Mater., 43 (2001) p. 319; Hedlund et al., J. Membr. Sci., 159 (1999) p. 263; Gopalakrishnan et al., J. Membr. Sci., 274 (2006) p. 102; Zhong et al., Microporous Mesoporous Mater., 118 (2009) p. 224; Wegner et al., J. Membr. Sci., 158 (1999) p. 17). Hedlund et al. also reported lower permeances but higher $H_2/N_2$ ideal selectivities for ZSM-5 membranes prepared without a template (J. Membr. Sci., 159 (1999) p. 263).

An alternate approach to minimize defect formation in zeolite membranes is to remove templates at lower than usual temperatures. Ozone has been used in some studies to accomplish this, and Henga et al. reported complete template removal from 2-µm thick MFI membranes after 30 min at 473 K in oxygen that contained ozone (Kuhna et al., J. Membr. Sci., 339 (2009) p. 261; Motuzas et al., Microporous and Mesoporous Mater., 99 (2007) p. 197; Henga et al., J. Membr. Sci., 243 (2004) p. 69; Parikh et al., Microporous and Mesoporous Mater., 76 (2004) p. 17). Longer times were required for membranes that were thicker or had higher alumina content. In contrast, Kuhn et al. reported that fluxes for ozone-treated MFI membranes were 80% lower than those for membranes prepared by normal calcination, indicating that ozone did not completely remove the template (J. Membr. Sci., 339 (2009) p. 261). Motuzas et al. reported that ozone treatment, calcination at 0.2 K/min in air, and calcination at 5 K/min in air yielded MFI membranes with similar n/i-$C_4H_{10}$ ideal selectivities, but the permeances were lower for the ozone-treated membrane (Microporous and Mesoporous Mater., 99 (2007) p. 197).

Similarly, Parikh et al. removed templates from silicalite-1, AlPO-5, and ITQ-7 crystals in air at room temperature by using UV radiation from a medium-pressure mercury lamp (184-257 nm) to form ozone in-situ (Microporous and Mesoporous Mater., 76 (2004) p. 17). Templates have also been removed MFI and Beta type zeolites at 408 K by using solvents to decompose the templates (Jones et al., Micropor. Mesopor. Mater., 48 (2001) p. 57). None of these alternate methods for template removal were utilized for SAPO-34 membranes.

Kanazirev and Price (J. Catal., 161 (1996) p. 156) pointed out that previous studies indicate that the preferred procedure to activate many zeolite crystals, including BEA crystals, is thermal treatment in an oxygen-containing atmosphere with the final temperature being high enough to completely oxidize the template. However, they reported that a more efficient route to organic template removal is to first calcine the material in helium (750-800 K) so that the polymerization process which involves oxygen is suppressed, followed by a second higher temperature calcination step in oxygen (800-850 K). They observed, using TGA to measure weight loss, that oxygen caused the template to decompose/oxidize at a lower temperature than when the zeolite was heated in helium, but 33% of the template remained in the crystals that were heated in a 25% $O_2$ stream (temperature less than 773 K). The residue from the partial oxidation was not removed until 900 K. They explained this un-expected behavior as due to formation of more stable species by polymerization, cyclization, and other reactions initiated by oxygen. They reported that the first calcination step under helium at approximately 750-800 K results in a material which contains a smaller amount of residue, which can then be removed through the second calcination step in the presence of oxygen at approximately 800-850 K.

Despite advances in this field, there remains a need in the art for improved methods of making zeolite membranes, in particular SAPO membranes, with desirable separation properties, such as high permeance and/or separation selectivities, and increased reproducibility.

SUMMARY OF THE INVENTION

The present invention provides methods for making improved zeolite and crystalline silicoaluminophosphate (SAPO) membranes, in particular SAPO-34 membranes, on a porous support through improved removal of the organic structure-directing templating agent. Inorganic zeolite membranes such as SAPO membranes can have superior thermal, mechanical and chemical stability, good erosion resistance, and high pressure stability as compared to conventional polymeric membranes. The membranes of the present invention provide increased permeance while maintaining suitable selectivity for gas separations, particularly carbon dioxide ($CO_2$) and methane ($CH_4$) separations and separations at high pressures.

High temperature calcination in oxidative environments (air or oxygen) has often been used in the preparation of zeolite membranes to remove organic templating agents (also referred to as organic templates) from the synthesized membranes. For example, SAPO membranes are generally prepared via hydrothermal synthesis by contacting a membrane forming gel (also sometimes referred to as a synthesis gel) with a porous support and heating for several hours at temperatures in excess of 420 K. The membrane forming gel generally comprises $Al_2O_3$, $P_2O_5$, $SiO_2$, $H_2O$ and an organic templating agent. After formation of the membrane, the membranes are typically washed, dried and then calcined in normal air at high temperatures in excess of 720 K to remove the templating agent.

As used herein, "template removal" and "removing the templating agent" both refer to removing at least a portion of an organic templating agent and thermal decomposition products formed from the templating agent from a zeolite material, particularly a SAPO membrane, through a process which comprises heating the zeolite material. In one embodiment, the present invention provides zeolite membranes, particularly SAPO membranes, prepared using hydrothermal synthesis where the organic templating agent is removed in an oxygen ($O_2$) free or $O_2$ reduced atmosphere. This can be achieved by heating the material under a vacuum or in an inert gas.

In previous methods, removal of the templating agent is typically achieved by calcining the membrane in an oxygen-containing atmosphere at high temperatures (i.e., typically between 720 K and 825 K) for several hours. However, it is believed that in the presence of oxygen during the calcination step, some of the organic templating agent oxidizes to a more stable species which remains in the zeolite membrane. Higher temperatures are then required to remove the oxidized product, which may generate membrane defects (e.g. cracks) because of thermal mismatch between the zeolite membrane and support. By removing the templating agent in a vacuum or under an inert gas, the template removal step does not form oxidized derivatives from the templating agent. The template removal step can be conducted at significantly lower temperatures, preferably below 700 K, and can remove a greater amount of the organic template or its decomposition products than comparable template removal steps conducted in the presence of significant quantities of $O_2$. The use of lower template removal temperatures can reduce the formation of calcination-related defects in the membrane, such as cracks, resulting in higher quality membranes. The resulting membranes also have improved separation characteristics, such as permeance, over membranes whose templates were removed in the presence of oxygen.

In one embodiment, the present invention provides a method for making a zeolite membrane comprising the steps of: a) providing a porous support having a first and a second side; b) preparing a zeolite forming membrane gel containing an organic templating agent; c) contacting at least one side of the porous support with the membrane gel; d) following the contacting step, heating the porous support and the membrane gel to a temperature in excess of 420 K wherein the membrane gel forms a crystalline zeolite layer on the porous support and; e) removing the templating agent, such as through calcination, in an $O_2$ reduced atmosphere or an $O_2$ free atmosphere. The membrane gel can be any gel or composition known in the art able to form a zeolite membrane on a porous support as the result of hydrothermal synthesis.

In a further embodiment, the present invention provides a method for making a crystalline silicoaluminophosphate (SAPO) membrane, the method comprising the steps of: a) providing a porous support having a first and a second side; b) preparing an aqueous SAPO forming membrane gel, wherein the membrane gel comprises aluminum, phosphorus, silicon, oxygen, an organic templating agent and water; c) contacting at least one side of the porous support with the membrane forming gel; d) following the contacting step, heating the porous support and the membrane gel to form a membrane layer of SAPO crystals on the porous support; and e) heating the membrane layer at a temperature from about 600 K to about 1050 K in an $O_2$ reduced atmosphere or an $O_2$ free atmosphere thereby removing the templating agent from the membrane layer. In one embodiment, the SAPO membrane is a SAPO-34 membrane.

In one embodiment, the membrane layer is heated at a temperature from about 600 K to about 1050 K to remove the templating agent. In a further embodiment, the membrane layer is heated at a temperature from about 625 K to about 750 K to remove the templating agent. In a further embodiment, the membrane layer is heated at a temperature from about 650 K to about 700 K to remove the templating agent. In a further embodiment, the membrane layer is heated at a temperature from about 650 K to about 675 K to remove the templating agent.

In a further embodiment, the template removal step is performed by heating the membrane layer from 2.5 hours to 24 hours at the desired temperature. In another embodiment, the template removal step is performed by heating the membrane layer from 2.5 hours to 15 hours at the desired temperature. In another embodiment, the template removal step is performed by heating the membrane layer from 3 hours to 10 hours at the desired temperature. In another embodiment, the template removal step is performed by heating the membrane layer from 3.5 hours to 4.5 hours at the desired temperature.

In one embodiment, the template removal step is performed by heating the membrane for 3 hours to 10 hours at a temperature from about 650 K to about 700 K. In a further embodiment, the template removal step is performed by heating the membrane for 3.5 hours to 4.5 hours at a temperature from about 650 K to about 675 K.

By "$O_2$ reduced atmosphere", it is meant that the templating agent is removed from the membrane layer in a gas atmosphere containing less than 10% $O_2$ by volume, preferably less than 5% $O_2$, more preferably less than 3% $O_2$, more preferably less than 2% $O_2$, more preferably less than 1% $O_2$, more preferably less than 0.1% $O_2$, even more preferably less than 0.01% $O_2$. By "$O_2$ free atmosphere", it is meant that the template is removed in a gas atmosphere containing no significant amounts of $O_2$ (such as less than 0.001%). In some embodiments, the templating agent is removed by heating the membrane layer under a vacuum, including but not limited to low vacuums (100 kPa to 3 kPa), medium vacuums (3 kPa to 100 mPa) and high vacuums (100 mPa to 100 nPa). In one embodiment, the templating agent is removed by heating the membrane layer under a low vacuum or medium vacuum. In another embodiment the templating agent is removed by heating the membrane layer under an inert gas. As used herein, an "inert gas" is any gas which is chemically non-reactive under the template removal conditions provided herein, and which can include but is not limited to nitrogen, argon, helium, neon, krypton, xenon and combinations thereof. In one embodiment, the templating agent is removed by heating the membrane layer under an inert gas selected from the group consisting of nitrogen, argon, helium and combinations thereof. As used herein, "air" refers to the general gas composition of Earth's atmosphere. Dry air contains roughly (by volume) 78% nitrogen, 21% oxygen, 0.93% argon, 0.038% carbon dioxide, and small amounts of other gases.

As a result of heating the membrane layer, 90% or more of the templating agent and its decomposition products is removed from the membrane, preferably 95% or more, preferably 99% or more, or even more preferably all of the templating agent and its decomposition products is removed from the membrane. In one embodiment, heating the membrane layer does not form any oxidized derivatives from the templating agent. In a further embodiment, no additional calcination steps are performed to remove the templating agent or any oxidized derivatives thereof, which includes any subsequent calcination steps performed in the presence of $O_2$. In some embodiments, the membrane gel comprises two or more templating agents, wherein the template removal step removes each of the templating agents.

Organic templating agents suitable for use in the present invention include any organic templating agents known in the art for making zeolite membranes, particularly SAPO membranes, and include embodiments where two or more different organic templating agents are used. In one embodiment, the organic templating agent is a quaternary organic ammonium templating agent, or in embodiments where two or more organic templating agents are used, a combination of a quaternary organic ammonium compound and one or more small amines. Examples of suitable organic templating agents include, but are not limited to, tetrapropyl ammonium hydroxide (TPAOH), tetrapropyl ammonium bromide, tetrabutyl ammonium hydroxide, tetrabutyl ammonium bromide, tetraethyl ammonium hydroxide (TEAOH), tetraethyl ammonium bromide, tetraethylammonium chloride (TEACl), dipropylamine (DPA), N,N-dimethylbutylamine (DMBA), N,N-dimethylethanolamine (DMEA), morpholine (MOR), cyclohexylamine (CHA) and combinations thereof. In one embodiment, the organic templating agent is a quaternary organic ammonium templating agent, such as (TEAOH).

The porous support is a body capable of supporting the SAPO membrane. The porous support may be of any suitable shape, including disks, flat panels, and tubes. The porous support is a metal or an inorganic material. In one embodiment, the porous support does not appreciably dissolve or form reaction products at the interface when placed in contact with the membrane synthesis gel. Suitable inorganic porous supports include, but are not limited to, α-alumina, glass, titania, zirconia, carbon, silicon carbide, clays or silicate minerals, aerogels, supported aerogels, and supported silica, titania and zirconia. In one embodiment, the porous support is aluminum oxide ($Al_2O_3$). Suitable porous metal supports include, but are not limited to, stainless steel, nickel based alloys (Inconel, Hastalloy), Fecralloy, chromium and titanium. The metal may be in the form of a fibrous mesh (woven or non-woven), a combination of fibrous metal with sintered metal particles, and sintered metal particles. In an embodiment, the metal support is formed of sintered metal particles. Ceramic supports having different porosity layers are commercially available (for example Membralox ceramic membranes available from Pall Corp.) The average pore size of the support can range from 2 nm to 500 nm, preferably between 5 nm to 200 nm. In further embodiments, the pore size is between 100 nm to 200 nm, 25 nm to 500 nm, or 50 nm to 300 nm.

In an embodiment, the pore size of the support is relatively uniform throughout the support. In this case, the pore size at the surface of the support can be characterized by the pore size of the support as a whole. In an embodiment, the pore size characteristic of the surface of the support may be taken as the pore size characteristic of the support as a whole.

In an embodiment, the support may have a different pore size at or near the surface on which the membrane is to be formed than the pore size away from the surface. For example, the support may have two well-defined regions, a first layer with a smaller average pore size (on which the membrane is to be formed) and a second layer with a larger average pore size. When the support has regions or layers which differ in pore size, the pore size at the surface can be characterized by pore size of the region or layer nearest the surface on which the membrane is to be formed. In an embodiment, the pore size characteristic of the surface of the support may be taken as the pore size characteristic of the surface layer or region of the support.

In an embodiment, the pore diameter of the support or the surface region of the support is large enough to allow the synthesis gel to penetrate the support. When SAPO-34 crystals are applied to the surface of the support prior to in situ synthesis, the pore size of the support or of its surface region can be smaller than, equal to, or greater than the characteristic size of the particles. In an embodiment, the average characteristic size of the loose SAPO crystals is larger than the average pore size of the support. This limits the extent of penetration of the crystals inside the support. Often, a porous support will have a distribution of pore sizes. In an embodiment, the pore diameter of the support or the surface region of the support is greater than about 0.1 microns. The pore diameter of the support being greater than about 0.1 microns does not require that every single pore in the support is greater than about 0.1 microns, but it does exclude supports having regions where the characteristic pore size is about 0.1 microns (for example, a support having a layer with an 0.1 micron average pore size). The characteristic pore size may be taken as the average, median or largest pore size.

In one embodiment, at least part of the surface of the porous support is seeded with SAPO crystal material prior to contact with the membrane forming gel. Seeding can be accomplished using a variety of methods, including but not limited to dip coating and rubbing. The deposited seed crystals provide nucleation sites for crystal growth during synthesis of the SAPO layer. In one embodiment, a lower seed density on the porous support may be preferable in order to grow optimal membranes. In one embodiment, the average amount of seed particles deposited on the support is 0.6 $g/m^2$ or less, where this value is calculated as the weight of deposited crystals divided by the approximate surface area over which the particles are applied. In a further embodiment, the average amount of seed particles deposited on the support is 0.4 $g/m^2$ or less, 0.2 $g/m^2$ or less, or 0.1 $g/m^2$ or less.

Optionally, the membrane forming gel is aged several hours to several days prior to contacting the porous support. In a further embodiment, the porous support is soaked in the membrane forming gel for several hours, preferably between two to fourteen hours, prior to the hydrothermal synthesis.

The SAPO layer may be formed on one or both sides of the porous support. When the porous support is a disk or panel having an upper and lower surface, the SAPO layer is typically formed on either the upper surface or the lower surface. When the support is in the form of a tube having an inner and an outer surface, the SAPO layer may be formed on either the inner or the outer surface. In an embodiment, the membranes of the present invention have a SAPO layer having a thickness of less than about 10 µm. In another embodiment, the membranes have a SAPO layer having a thickness of less than about 5 µm. In another embodiment, the membranes have a SAPO layer having a thickness of less than about 4 µm. In one embodiment, the membranes have a SAPO layer between approximately 5 µm and 6 µm.

In one embodiment, the present invention provides a supported SAPO membrane, including but not limited to a SAPO-34 membrane, generated by: a) providing a porous support having a first and a second side; b) preparing an aqueous SAPO forming membrane gel, wherein the membrane gel comprises aluminum, phosphorus, silicon, oxygen, an organic templating agent and water; c) contacting at least one side of the porous support with the membrane forming gel; d) following the contacting step, heating the porous support and the membrane gel to form a membrane layer of SAPO crystals on the porous support; and e) heating the membrane layer at a temperature from about 600 K to about 1050 K in an $O_2$ reduced atmosphere or an $O_2$ free atmosphere thereby removing the templating agent from the membrane layer. In further embodiments, the membrane layer is heated in an $O_2$ reduced atmosphere or an $O_2$ free atmosphere at a temperature from about 625 K about to about 750 K, or from about 650 K about to about 700 K, or from about 650 K about to about 675 K. In an embodiment, the membrane layer is heated under a vacuum. In another embodiment, the membrane layer is heated in an atmosphere consisting essentially of an inert gas. In a further embodiment, the inert gas is selected from the group consisting of nitrogen, argon, helium and combinations thereof.

In an embodiment, SAPO-34 membranes prepared as described above have a SAPO layer having a thickness of less than about 10 µm. In another embodiment, the membranes have a SAPO layer having a thickness of less than about 5 µm. In another embodiment, the membranes have a SAPO layer having a thickness of less than about 4 µm. In one embodiment, the membranes have a SAPO layer between approximately 5 µm and 6 µm.

In an embodiment, the templating agent is removed by heating the membrane layer at a temperature from about 600 K to about 1050 K, preferably from about 625 K to about 750 K, more preferably from about 650 K to about 700 K, even more preferably from about 650 K to about 675 K. In one embodiment, the template removal step is performed by heating the membrane layer for 3 hours to 10 hours at a temperature from about 650 K to about 700 K. In a further embodiment, the template removal step is performed by heating the membrane layer for 3.5 hours to 4.5 hours at a temperature from about 650 K to about 675 K. Preferably, the membrane contains no remaining amounts of the templating agent or an oxidized derivative thereof after heating. Preferably, no additional calcination steps are performed to remove the templating agent.

Transport of gases through a zeolite-type membrane can be described by several parameters. As used herein, the flux, $J_i$, through a membrane is the number of moles of a specified component i passing per unit time through a unit of membrane surface area normal to the thickness direction. The permeance or pressure normalized flux, $P_i$, is the flux of component i per unit trans-membrane driving force. For a diffusion process, the trans-membrane driving force is the gradient in chemical potential for the component (Kärger et al, Diffusion in Zeolites, John Wiley and Sons: New York, 1992, pp. 9-10). The selectivity of a membrane for components i over j, $S_{i/j}$ is the permeance of component i divided by the permeance of component j. The ideal selectivity is the ratio of the permeances obtained from single gas permeation experiments. The actual selectivity (also called separation selectivity) for a gas mixture may differ from the ideal selectivity.

The SAPO membranes and other zeolite membranes produced using the methods described herein have at least one improved gas separation property at high pressures as compared to previously reported SAPO membranes. For example, the present invention provides SAPO membranes prepared using a template removal step in an $O_2$ reduced atmosphere or an $O_2$ free atmosphere, wherein the SAPO membrane has improved $CO_2$ permeance as compared to SAPO membranes prepared using a template removal step in the presence of $O_2$. While the permeance of the membranes may be improved, the $CO_2/CH_4$ separation selectivity of the membranes of the present invention may be equal to or below the separation selectivity of previously known membranes. One embodiment provides SAPO membranes having twice the $CO_2$ permeance compared to SAPO-34 membranes prepared in the same manner except that the templating agent was removed in the presence of significant quantities of $O_2$. One embodiment provides SAPO-34 membrane having at least 30% greater $CO_2$ permeance over membranes prepared in the same manner except that the templating agent was removed in the presence of significant quantities of $O_2$. In a further embodiment, SAPO-34 membranes prepared as described herein have at least 50%, preferably at least 75%, preferably at least 90%, preferably at least 100% greater $CO_2$ permeance over membranes prepared in the same manner except that the templating agent was removed in the presence of significant quantities of $O_2$. For example, the $CO_2$ permeance of the membranes of the present invention may be at least 30%, 50%, 75%, 90% or 100% greater than membranes prepared in the same manner except that the templating agent was removed in an air atmosphere.

In one embodiment, SAPO-34 membranes prepared as described above have a $CO_2/CH_4$ separation selectivity of 40 or greater for an approximately 50/50 molar $CO_2/CH_4$ mixture at room temperature (295 K) with a feed pressure of 4.6 MPa and a permeate pressure of 84 kPa. Preferably the SAPO-34 membranes have a $CO_2/CH_4$ separation selectivity of 50 or greater, 55 or greater, or even more preferably 60 or greater for a 50/50 molar mixture and some pressure differential between the permeate side and feed side.

In one embodiment, SAPO-34 membranes prepared as described above have a $CO_2$ permeance of $5.8 \times 10^{-7}$ mol/$(m^2 \cdot s \cdot Pa)$ or greater for an approximately 50/50 molar $CO_2/CH_4$ mixture at room temperature (295 K) with a feed pressure of 4.6 MPa and a permeate pressure of 84 kPa. Preferably the SAPO-34 membranes have a $CO_2$ permeance of $7.5 \times 10^{-7}$ mol/$(m^2 \cdot s \cdot Pa)$ or greater, even more preferably $8.2 \times 10^{-7}$ mol/$(m^2 \cdot s \cdot Pa)$ or greater for a 50/50 molar mixture and some pressure differential between the permeate side and feed side.

In one embodiment, SAPO-34 membranes prepared as described above have a $CO_2/CH_4$ separation selectivity of 45 or greater and a $CO_2$ permeance of $5.8 \times 10^{-7}$ mol/($m^2 \cdot s \cdot Pa$) or greater for an approximately 50/50 molar $CO_2/CH_4$ mixture at room temperature (295 K) with a feed pressure of 4.6 MPa and a permeate pressure of 84 kPa. In a further embodiment, the present invention provides SAPO-34 membranes having a $CO_2/CH_4$ separation selectivity of 50 or greater and a $CO_2$ permeance of $7.5 \times 10^{-7}$ mol/($m^2 \cdot s \cdot Pa$) or greater for a 50/50 molar mixture and some pressure differential between the permeate side and feed side.

As used herein, "room temperature" refers to a temperature between 293 K to 298 K.

One embodiment of the present invention provides methods for separating a first gas component from a gas mixture containing at least a first and a second gas component using the SAPO membranes described herein. Preferably the first gas component is carbon dioxide and the second gas component is methane. The separating method comprises the steps of: a) providing a crystalline silicoaluminophosphate (SAPO) membrane, preferably a SAPO-34 membrane, the membrane having a feed and a permeate side and being selectively permeable to the first gas component over the second gas component, wherein the SAPO membrane is made by: i) providing a porous support having a first and a second side; ii) preparing an aqueous SAPO forming membrane gel, wherein the membrane gel comprises aluminum, phosphorus, silicon, oxygen, an organic templating agent and water; iii) contacting at least one side of the porous support with the membrane forming gel; iv) following the contacting step, heating the porous support and the membrane gel to form a membrane layer of SAPO crystals on the porous support; and v) heating the membrane layer at a temperature from about 600 K to about 1050 K in an $O_2$ reduced atmosphere or an $O_2$ free atmosphere thereby removing the templating agent from the membrane layer; b) applying a feed stream including the first and the second gas components to the feed side of the membrane; and c) providing a driving force sufficient for permeation of the first gas component through the membrane, thereby producing a permeate stream enriched in the first gas component from the permeate side of the membrane. In one embodiment, the first gas component is carbon dioxide ($CO_2$) and the second gas component is methane ($CH_4$). In further embodiments, the membrane layer is heated in an $O_2$ reduced atmosphere or an $O_2$ free atmosphere at a temperature from about 625 K about to about 750 K, or from about 650 K about to about 700 K, or from about 650 K about to about 675 K.

As described herein, the template removal steps improve the permeance and quality of SAPO and other zeolite membranes. Scanning electron microscope (SEM) images, temperature-programmed desorption (TPD) and temperature-programmed oxidation (TPO) experiments were used to characterize SAPO-34 crystals and membranes from certain embodiments of the present invention.

DETAILED DESCRIPTION OF THE INVENTION

Figure 1:
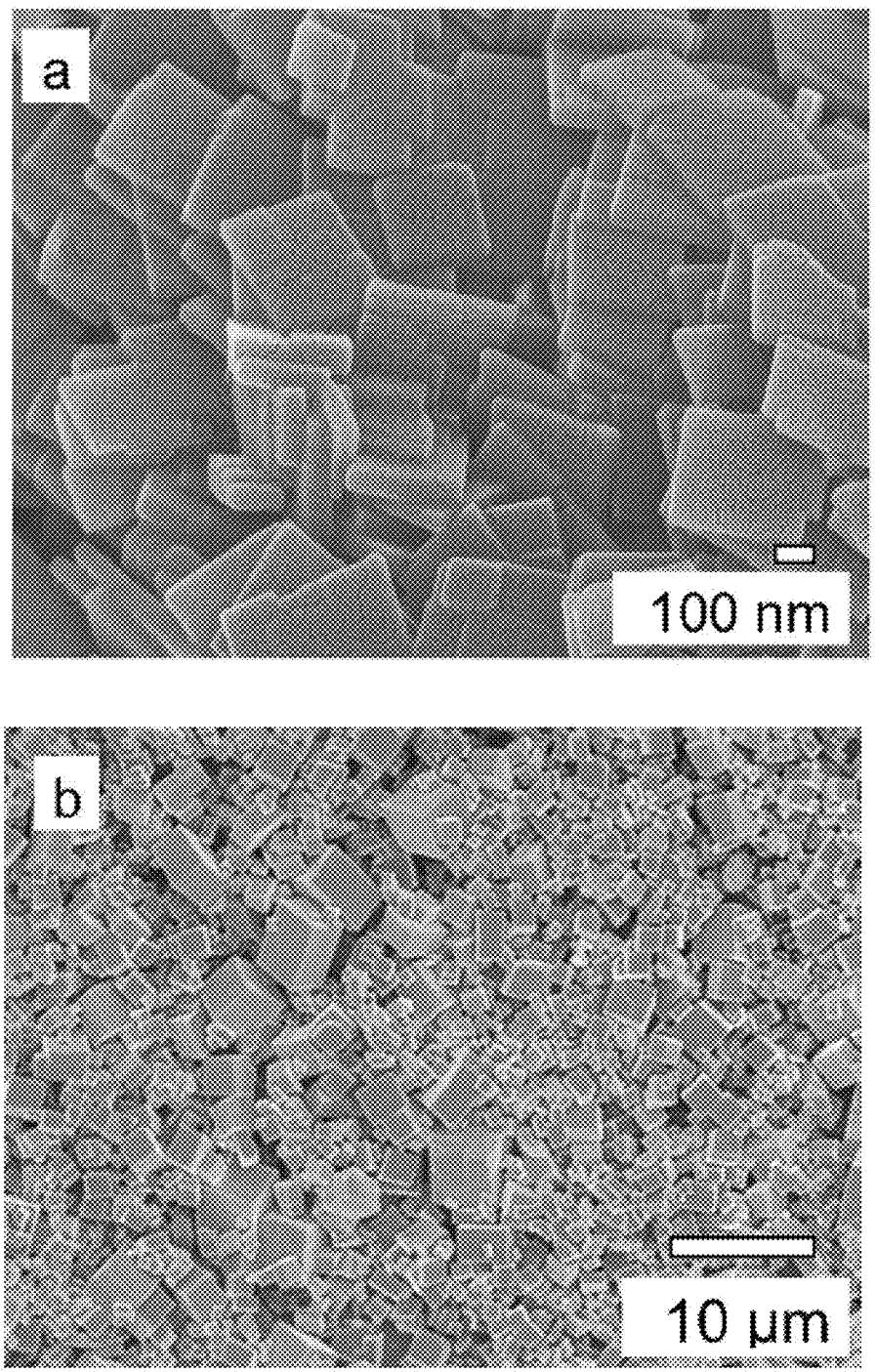
FIGS. 1a and 1b show scanning electron micrographs of SAPO-34 seed crystals used for membrane preparations (FIG. 1a), and loose crystals collected from the bottom of an autoclave after SAPO-34 membrane synthesis (FIG. 1b).

The methods of the invention provide improved silicoaluminophosphate (SAPO) membranes and other zeolite membranes, particularly SAPO-34 membranes. SAPOs are zeolite-type molecular sieve materials, having a tetrahedral crystal structure joined together through oxygen atoms to produce an extended network of channels of molecular dimensions. SAPO crystals which form a membrane layer will have a three-dimensional crystal framework structure of $PO_2+$, $AlO_2-$ and $SiO_2$ tetrahedral units and will have an interconnected framework structure of regular cages, cavities, and channels. The dimensions of the channels and cavities in the membranes are generally microporous. As used herein, "microporous" refers to pore diameters less than about 2 nanometers.

Crystalline SAPO-34 has the CHA structure and is an analog of the natural zeolite chabazite. The CHA framework structure contains single eight ring, double six ring, and single four ring secondary building units. SAPO-34 adsorption measurements have determined that n-$C_4H_{10}$ (0.43 nm diameter) can fit in the pores, but i-$C_4H_{10}$ (0.5 nm) diameter cannot, thus the pore size is believed to be between 0.43 and 0.5 nm (Lok et al., in Lok. et al. (eds.) Crystalline Silicoalumino Phosphates, US, 1984).

Other SAPOs have different structures and different pore sizes. SAPOs and other molecular sieves can be classified as small, medium, or large-pore molecular sieves based on the size of the largest oxygen rings in the structure. Crystalline SAPO-5 has the AFI structure which contains rings of 12 oxygen atoms, 6 oxygen atoms, and 4 oxygen atoms. SAPO-5 is typically considered a large-pore molecular sieve. In contrast, crystalline SAPO-11 has the AEL structure which contains rings of 10 oxygen atoms, 6 oxygen atoms, and 4 oxygen atoms. SAPO-11 is typically considered a medium-pore molecular sieve. Structures where the largest ring contains 8 or fewer oxygen atoms are typically considered small-pore molecular sieves. Further information regarding SAPO structures is available in Baerlocher, W. M. Meier and D. H. Olson, "Atlas of Zeolite Framework Types", 5th ed., Elsevier: Amsterdam, 2001 and online at http://www.iza-strucures.org/databases.

SAPOs exhibit cation exchange properties. The excess negative charge in the lattice may be compensated by protons or by compensating cations located in the cavities of the structural framework. Acid hydrogen forms of SAPOs (e.g. H-SAPO-34) have protons that are loosely attached to their framework structure in lieu of inorganic compensating cations. Other forms of SAPO-34 include, but are not limited to Na-SAPO-34, Cu-SAPO-34, Li-SAPO-34, K-SAPO-34, Rb-SAPO-34, and Ca-SAPO-34. These may be made through ion-exchange of H-SAPO-34 or by including the appropriate cation in the synthesis gel.

The membranes of the invention are formed through in situ crystallization of an aqueous membrane forming gel. The membrane forming gel contains one or more organic templating agents. The term "templating agent" or "template" is a term of art and refers to a species added to the synthesis media to aid in and/or guide the polymerization and/or organization of the building blocks that form the crystal framework. Membrane gels for forming zeolites and SAPO crystals are known to the art, but preferred gel compositions for forming membranes may differ from preferred compositions for forming loose crystals or granules. The preferred gel composition may vary depending upon the desired crystallization temperature and time.

The membrane gel is typically prepared by mixing sources of aluminum, phosphorus, silicon, and oxygen in the presence of a templating agent and water. Generally, the gel comprises Al, P, Si, O, a templating agent and water. In one embodiment, the composition of the mixture may be expressed in terms of the following molar ratios as:

$$1.0Al_2O_3 : aP_2O_5 : bSiO_2 : cR : dH_2O \quad \text{Formula 1,}$$

where R is a templating agent. Preferably, R is a quaternary ammonium templating agent. In a further embodiment, the quaternary ammonium templating agent is selected from the group consisting of tetrapropyl ammonium hydroxide (TPAOH), tetrapropyl ammonium bromide, tetrabutyl ammonium hydroxide, tetrabutyl ammonium bromide, tetraethyl ammonium hydroxide (TEAOH), or tetraethyl ammonium bromide. In one embodiment suitable for crystallization between about 420 K and about 540 K, a is between about 0.01 and about 52, b is between about 0.03 and about 196, c is between about 0.2 and about 5 and d is between about 20 and about 300. If other elements are to be substituted into the structural framework of the SAPO, the gel composition can also include $Li_2O$, BeO, MgO, CoO, FeO, MnO, ZnO, $B_2O_3$, $Ga_2O_3$, $Fe_2O_3$, GeO, TiO, $As_2O_5$ or combinations thereof. If compensating cations are to be included in the cavities of the structural framework, the gel composition can also include sources of the compensating cations (for example, NaOH for $Na^+$, LiOH for $Li^+$, KOH for $K^+$, RbOH for $Rb^+$, and CsOH for $Cs^+$)

In an embodiment suitable for crystallization of SAPO-34, c is less than about 2. In an embodiment suitable for crystallization of SAPO-34 at 453K to 533K for 20-24 hours, a is about 1, b is 0.03-0.6, c is 1.07-1.2 and d is 55-56. In other embodiments, the ratio of silicon to aluminum is between 0.3 and 0.15, is between 0.2 and 0.15, and is 0.15. R is a quaternary organic ammonium templating agent selected from the group consisting of tetrapropyl ammonium hydroxide, tetraethyl ammonium hydroxide (TEAOH), or combinations thereof.

One important gel composition parameter is the ratio of Si to Al. Preferably, the ratio of Si to Al is high enough so that $AlPO_5$ is not formed. In different embodiments, the ratio of silicon to aluminum is greater than 0.1, greater than 0.10 and less than or equal to 0.6, between 0.10 and 0.6, between 0.15 and 0.45, between 0.15 and 0.3, from 0.15 to 0.2, or is about 0.15.

In one embodiment, the gel comprises at least two templating agents. Any templating agent or each templating agent, independently of one another, may comprise nitrogen. In an embodiment, the gel includes only two templating agents, where optionally one templating agent is a quaternary ammonium compound and the second templating agent is an amine. In another embodiment, the gel includes three templating agents, where optionally the first templating agent is a quaternary ammonium compound, and the second and third templating agents are amines. A given templating agent may form ionic species in the gel, so that the gel also contains ionic species derived from the templating agent. For example, quaternary ammonium compounds may produce quaternary ammonium cations in the gel.

In one embodiment, the gel comprises Al, P, Si, O, at least two templating agents and water. The composition of the mixture may be expressed in terms of the following molar ratios as:

$$Al_2O_3 : aP_2O_5 : bSiO_2 : cR_1 : dR_2 : eH_2O \quad \text{Formula 2,}$$

where $R_1$ and $R_2$ are both templating agents. If other elements are to be substituted into the structural framework of the SAPO, the gel composition can also include $Li_2O$, BeO, MgO, CoO, FeO, MnO, ZnO, $B_2O_3$, $Ga_2O_3$, $Fe_2O_3$, GeO, TiO, $As_2O_5$ or combinations thereof. If compensating cations are to be included in the cavities of the structural framework, the gel composition can also include sources of the compensating cations (for example, NaOH for $Na^+$, LiOH for $Li^+$, KOH for $K^+$, RbOH for $Rb^+$, and CsOH for $Cs^+$). In an embodiment suitable for crystallization of SAPO-34 at 453K to 533K for 20-24 hours, a is greater than 0.5 and less than 1.5, b is greater than 0.2 and less than 1.0, c is greater than or equal to 1 and less than 2, and d is greater than zero and less than 4.0 and e is greater than 50 and less than 110. In different embodiments, the ratio of silicon to aluminum is greater than 0.1, between 0.15 and 0.45, from 0.15-0.45, between 0.15 and 0.3, from 0.15-0.3, between 0.15 and 0.2, from 0.15 to 0.2 and is about 0.15.

In an embodiment, $R_1$ is a quaternary organic ammonium templating agent. Preferably, the quaternary ammonium templating agent is selected from the group consisting of tetrapropyl ammonium hydroxide (TPAOH), tetrapropyl ammonium bromide, tetrabutyl ammonium hydroxide, tetrabutyl ammonium bromide, tetraethyl ammonium hydroxide (TEAOH), tetraethyl ammonium bromide, tetraethylammonium chloride (TEACl) or combinations thereof. In another embodiment, the quaternary ammonium templating agent is selected from the group consisting of TPAOH, TEAOH or combinations thereof. In an embodiment, the templating agent is TEAOH. In an embodiment, the value of parameter c is greater than or equal to 1 and less than or equal to 2. In another embodiment, the value of parameter c is greater than or equal to 1 and less than or equal to 1.6.

In an embodiment, $R_2$ is an amine, which may be a "small amine". As used herein, the term "small amines" refers amines and organic amines having a molecular weight (Mn) of less than or equal to 300 and/or equal to or less than 12 carbon atoms. The amine may be a neutral amine. In an embodiment, $R_2$ is a primary, secondary or tertiary amine. In different embodiments, $R_2$ may be an aliphatic or a cyclic amine. In an embodiment, $R_2$ is an alkyl amine such as dipropylamine (DPA) or N,N-dimethylbutylamine (DMBA). In another embodiment, $R_2$ may have both an amine and an alcohol functionality, such as N,N-dimethylethanolamine (DMEA). $R_2$ may also be morpholine (MOR). In an embodiment, $R_2$ is selected from the group consisting of dipropylamine (DPA) and cyclohexylamine (CHA). In an embodiment, $R_2$ is DPA. In different embodiments, the value of parameter d is greater than or equal to 1 and less than or equal to 4, between 1.0 and 3.0, from 1.0 to 3.0, between 1.0 and 2.0, or from 1.0 to 2.0. In an embodiment, the initial pH of a gel combining TEAOH with DPA is between about 9 and about 10, the initial pH of a gel combining TEAOH with CHA is between about 8 and about 8.5.

When a combination of three templating agents is used, the composition of the mixture may be expressed in terms of the following molar ratios as:

$$Al_2O_3 : aP_2O_5 : bSiO_2 : cR_1 : d_1R_2 : d_2R_3 : eH_2O \quad \text{Formula 3}$$

In an embodiment, the value of parameter $d_1$ in Formula 3 is between 0.5 and 1.5 and the value of parameter $d_2$ is between 0.5 and 1.5. In an embodiment, $R_2$ and $R_3$ are dipropylamine (DPA) and cyclohexylamine (CHA). In another embodiment, $d_1$ and $d_2$ are both between 0.5 and 1.0. In an embodiment, the initial pH of a gel combining TEAOH with DPA and CHA is between about 8.5 and about 9.0. The values of the other parameters (a, b, c, e) may be as specified for Formulas 1 and 2.

The amount of water in the synthesis gel is also an important parameter. In an embodiment, the amount of water used in the membrane synthesis gel is significantly greater than that which would typically be used in a gel for synthesis of loose crystals of the same zeolite. In different embodiments, the value of the parameter e in Formulas 1-3 is greater than 50, between 50 and 110, from 50 to 110, between 60 and 100, from 60-100, between 70 and 90, from 70-90, between 70 and 80, or from 70-80.

In an embodiment, the synthesis gel composition is 1.0 $Al_2O_3$:1.0 $P_2O_5$:0.3 $SiO_2$:1.0 TEAOH:1.6 DPA:x $H_2O$, where x is between 70 and 80. In another embodiment, the synthesis gel composition is 1.0 $Al_2O_3$:1.0 $P_2O_5$:0.32 $SiO_2$:1.0 TEAOH:1.6 DPA:x $H_2O$, where x is from 70 to 160. In another embodiment, the synthesis gel composition is 1.0 $Al_2O_3$:1.0 $P_2O_5$:0.32 $SiO_2$:1.0 TEAOH:1.6 DPA:x $H_2O$, where x is 150.

Typically, the gel is prepared by mixing sources of phosphate and alumina with water for several hours before adding the template. The mixture is then stirred before adding the source of silica. In an embodiment, the source of phosphate is phosphoric acid. Suitable phosphate sources also include organic phosphates such as triethyl phosphate, and crystalline or amorphous aluminophosphates. In an embodiment, the source of alumina is an aluminum alkoxide, such as aluminum isopropoxide. Suitable alumina sources also include pseudoboehmite and crystalline or amorphous aluminophosphates (gibbsite, sodium aluminate, aluminum trichloride). In an embodiment, the source of silica is a silica sol. Suitable silica sources also include fumed silica, reactive solid amorphous precipitated silica, silica gel, alkoxides of silicon (silicic acid or alkali metal silicate).

Na-SAPO-34 can be made by incorporating NaOH into the synthesis gel. The gel composition can be expressed by: $Al_2O_3$:$aP_2O_5$:$bSiO_2$:$eNa_2O$:$cR$:$dH_2O$. In a further embodiment, a is 0.77, b is 0.46, e is 0.23, c is 0.77, and d is 46.

Optionally, the gel is aged prior to contact with the porous support. As used herein, an "aged" gel is a gel that is held (not used) for a specific period of time after all the components of the gel are mixed together or a gel that is maintained at a temperature below the membrane synthesis temperature for a specific period of time after all the components are mixed. In an embodiment, the gel is sealed and stirred during storage to prevent settling and the formation of a solid cake. Without wishing to be bound by any particular theory, it is believed that aging of the gel affects subsequent crystallization of the gel by generating nucleation sites. In general, it is believed that longer aging times lead to formation of more nucleation sites. The preferred aging time will depend upon the aging temperature selected. Preferably, crystal precipitation is not observed during the aging period. In an embodiment, the viscosity of the aged gel is such that the gel is capable of penetrating the pores of the porous support. After initial mixing of the components of the synthesis gel in a container, material can settle to the bottom of the container. In an embodiment, the gel is stirred and aged until no settled material is visible at the bottom of the container and the gel appears translucent and substantially uniform to the eye.

In different embodiments, the aging time is greater than two hours, greater than five hours, greater than ten hours, or greater than twenty four hours. In different embodiments, the aging time at room temperature is at least about twenty-four hours, greater than about twenty-four hours, at least about forty-eight hours, and at least about seventy-two hours. For SAPO-34 membranes, in different embodiments the aging time at room temperature or above can be at least twenty four hours, greater than about twenty-four hours at least about forty-eight hours, at least about seventy-two hours, between about three days and about seven days or between four days and 28 days. In an embodiment, the gel is not aged longer than one month. In different embodiments, the aging temperature is between 10° C. and 75° C. or between 25° C. and 60° C. In different embodiments, the aging time is at least 24 hours between 290 K and 350K, between 290K and 335K, or between 290 K and 300 K.

In other embodiments, aging of the gel is not required to obtain the desired quality of membrane. For example, gel aging may not be required if SAPO-34 crystals are applied to the support prior to in situ synthesis. In addition, gel aging may not be required for certain types of silica sources. In an embodiment, aging is not required if tetraethyl orthosilicate (TEOS) is used as the silica source.

The membrane forming gel is brought into contact with at least one surface of the porous support. If SAPO seed crystals have been applied to at least part of the surface of the support, the gel is brought into contact with at least this part of the surface. In an embodiment, the porous support has two sides (e.g. the inside and outside of a tube or the top or bottom of a plate or disk) and the gel is brought into contact with only one side of the support. One side of the support may be masked to limit its contact with the gel. Suitable masking techniques are known to the art. One known masking technique involves covering the surface with a polymer layer, for example covering it with Teflon or fluoropolymer tape. Another masking technique involves infiltrating the pores of the support with an organic masking agent, such as a polymer or a wax, which can later be removed through thermal treatment. In another embodiment, the porous support may be immersed in the gel so that more than one surface of the porous support contacts the gel. In an embodiment, at least some of the gel penetrates the pores of the support. The pores of the support need not be completely filled with gel. In an embodiment, the porous support is brought into contact with a sufficient quantity of gel such that growth of the SAPO membrane is not substantially limited by the amount of gel available.

After the porous support and the aged membrane forming gel are brought into contact, the support and gel are heated in a SAPO crystal synthesis step. This synthesis step can lead to formation of SAPO crystalline material on and in the porous support. Optionally, the porous support is soaked in the membrane gel for several hours prior to heating. As used herein, crystalline material includes both newly formed crystals and crystalline material grown on previously formed crystals. If SAPO crystals have been applied to the support prior to the synthesis step, the synthesis step results in the formation of a second quantity of crystalline material which may take the form of new crystals and/or growth of the applied crystals. During each synthesis step a layer of SAPO crystals can be said to form on the surface of the porous support and/or on previously formed SAPO crystals. The layer of SAPO crystals formed during each synthesis step may not be continuous.

During the synthesis step, crystals may also precipitate from the membrane forming gel without being incorporated into the SAPO membrane. In an embodiment, sufficient synthesis steps are performed that the membrane is impermeable to nitrogen after preparation (but before calcination).

In one embodiment, the heating temperature for the synthesis step is between about 420K and about 540 K. Preferably, the heating temperature is between about 453 K and about 533 K, or between about 470 K and about 515 K. The crystallization time is between about 2 and about 25 hours, preferably between about 4-6 hours. Synthesis typically occurs under autogenous pressure.

Typically, excess membrane gel is removed from the support and the SAPO crystals after each synthesis step. The excess gel may be removed by washing with water. After washing with water, the support and SAPO crystals may then be dried.

The synthesis step may be repeated in order to form a greater amount of SAPO crystals. After each synthesis step, the excess synthesis gel is removed and then the porous support is brought into contact with synthesis gel before performing the next synthesis step. Sufficient synthesis steps are performed so that the cumulative layer formed on the support surface by the synthesis steps and any crystal application steps forms a continuous layer. The SAPO membrane is formed by the cumulative layer(s) of SAPO crystals on the support surface(s) and the interconnected SAPO crystals formed inside the porous support. In an embodiment, the SAPO crystals inside the support are substantially interconnected. In an embodiment, the interconnected SAPO crystals are connected to the layers of SAPO crystals formed on the support surface. Loose SAPO crystals which are not organized as part of a membrane layer are not interconnected with other SAPO crystals. Accordingly, while SAPO crystals organized as part of a membrane and loose SAPO crystals may have similar chemical properties, SAPO membranes will have significant physical properties which may not be present in loose crystals.

In one embodiment, the SAPO membranes of the present invention comprise SAPO crystals which form a layer on at least one side of the porous support. SAPO crystals may also be present within at least some of the pores of the support. The thickness of the SAPO layer depends in part on the number of synthesis steps performed. In embodiment where synthesis steps are performed until the membrane is impermeable to nitrogen, the thickness of the cumulative SAPO layer is less than about 20 microns. When the layer thicknesses are measured from cross-sections with scanning electron microscopy, the uncertainty in the thickness measurement is believed to be on the order of +/−10%. In other embodiments, the thickness of the SAPO layer is about 5 microns, less than 5 microns or about 2.5 microns. In an embodiment, immersion of a porous support in the synthesis gel can lead to formation of SAPO crystals within the support as well as on both sides of the support. For example, immersion of a porous tube in the synthesis gel can lead to formation of SAPO crystals within the tube as well as formation of a SAPO layer on the inside and the outside of the tube. In an embodiment, the SAPO crystals may form throughout the thickness of the support. When both sides of the support are immersed and capable of being penetrated by the gel, formation of SAPO crystals throughout the thickness of the support indicates that the synthesis gel has penetrated to the center of the support. However, formation of SAPO crystals throughout the support does not require that SAPO crystals completely fill the pore space of the support.

Molecular sieve membranes comprise interconnected crystals as well as zeolite and non-zeolite pores. After membrane synthesis, the organic templating material may be present in the non-zeolite pores of the membrane as well as in the zeolite pores. Removal of templating agent from the zeolite pores may also remove templating agent from the non-zeolite pores. Removal of a greater amount of templating agent from the membrane can remove a greater amount of templating agent from the zeolite pores, which typically increases the contribution of these pores to gas transport through the membrane, which can give a positive contribution to the $CO_2/CH_4$ selectivity and $CO_2$ permeance of the membrane. However, removal of a greater amount of templating agent from the membrane can also increase the amount of templating agent removed from non-selective non-zeolite pores, which can increase the contribution of these non-selective pores to gas transport through the membrane and give a negative contribution to the selectivity. The $CO_2/CH_4$ selectivity and $CO_2$ permeance of the membrane will be determined by the combined effect of transport through both zeolite and non-zeolite pores.

After synthesis of the SAPO layers is complete, the SAPO membranes are typically calcined to substantially remove the organic template material. As used herein, "calcination" and "calcining" refers to heating a substance to a high temperature, but below its melting point, to bring about at least partial thermal decomposition of one or more materials in the substance. After calcination, the membrane becomes a semipermeable barrier between two phases that is capable of restricting the movement of molecules across it in a very specific manner. In different embodiments, the calcination temperature is between about 600 K and about 1050K, preferably between about 625 K and about 800 K, more preferably between about 625 K and about 775 K, more preferably between about 625 K and about 750 K, more preferably between about 650K and about 700 K, and even more preferably between about 650 K and 675 K.

For membranes made using TEAOH or TPAOH as a templating agent, the calcining temperature can be between about 600 K to 800K, or more preferably between about 625 K and about 750K, or more preferably between about 650 K and about 700K, or more preferably between about 650 K and 675 K. In one embodiment, the calcining temperature is between about 623 K and about 673 K. In an embodiment, the calcination time is between about 2.5 hours and about 25 hours, or more preferably between about 3 hours to about 10 hours, or more preferably from about 3.5 hours to 4.5 hours. Longer times may be required at lower temperatures in order to substantially remove the template material. Use of lower calcining temperatures can reduce the formation of calcining-related defects in the membrane. The heating rate during calcination should be slow enough to limit formation of defects such as cracks. In an embodiment, the heating rate is less than about 2.0 K/min. In a further embodiment, the heating rate is between about 0.5 to 2.0 K/min. In a further embodiment, the heating rate is between about 0.6 to 1.2 K/min. In a further embodiment, the heating rate is about 1.0 K/min. Similarly, the cooling rate must be sufficiently slow to limit membrane defect formation. In an embodiment, the cooling rate is less than about 2.0 K/min. In a further embodiment, the cooling rate is between about 0.5 to 2.0 K/min. In a further embodiment, the cooling rate is between about 0.8 to 1.2 K/min. In a further embodiment, the cooling rate is about 0.9 K/min.

High temperature calcination in oxidative environments has usually been used to remove the organic template from zeolite membranes. However, as provided herein, SAPO-34 membranes with higher gas permeances were obtained when the template was removed by heating in the absence of oxygen or in oxygen reduced atmospheres (such as under vacuum or under flowing nitrogen or helium, which are inert gases under these conditions). SAPO-34 membranes had 95-100% higher $CO_2$ permeances with only 9-17% lower $CO_2/CH_4$ separation selectivities when their structure-directing templates were removed at 673 K in flowing $N_2$, helium, or under vacuum instead of in flowing air. The average $CO_2$ permeance was $8.2\pm2\times10^{-7}$ mol/($m^2 \cdot s \cdot Pa$) for a 50/50 $CO_2/CH_4$ molar mixture at 4.6 MPa feed pressure and 84 kPa permeate pressure during $CO_2/CH_4$ separations for five membranes whose templates were removed under vacuum. The average $CO_2/CH_4$ separation selectivity was $55\pm6$. Membranes heated in $N_2$, helium or under vacuum were white in color, whereas those heated in air were darker. Membrane preparation was reproducible.

There are different ways to determine how much of the organic template material is incorporated into SAPO crystals or membranes and how much is removed during the calcination step. For example, the zeolite powder can be calcined at sufficiently high temperatures and the difference between the weight before and after calcination can indicate the amount of organic template material removed during the calcination step. Alternatively, temperature-programmed desorption (TPD) and oxidation (TPO) can be used to monitor the carbon content of compounds released during calcination. By adding all detected carbon-containing species together, the total amount of the organic template (or carbon) removed during calcination can be calculated.

Temperature-programmed desorption (TPD) and oxidation (TPO) of SAPO-34 crystals showed that more of the organic templating agents decomposed and were removed at lower temperature in inert gas than in air or oxygen. Over 90% of the templating agents were removed by a temperature of 773 K during TPD in helium, and ethylene was the main decomposition product. In contrast, only 70% of the templating agents were removed by a temperature of 773 K during TPO in air or oxygen, and $CO_2$ and water were the major products. Without wishing to be bound by theory, it is believed that when the SAPO-34 crystals were heated in air or $O_2$, some of the templating agent, before it decomposed to form ethylene, was oxidized to a more stable species that was only removed at higher temperatures. Although this improvement in membrane permeance is demonstrated for SAPO-34 membranes in the below examples, similar behavior can be expected for other zeolite membranes.

As described herein, the effect of oxygen on template removal from SAPO-34 membranes and SAPO-34 crystals was studied to identify conditions for template removal that would yield high quality membranes for $CO_2/CH_4$ separations at high pressure. Separations at high pressures are a much more severe test of membrane quality. Temperature-programmed desorption (TPD, in helium) and oxidization (TPO, in air or $O_2$) with mass spectrometric detection were used to study template removal from SAPO-34 crystals in an effort to identify the best conditions for SAPO-34 membranes. Although the temperature profile for TPD and TPO is not the same as the temperature profile used for template removal from SAPO-34 membranes, these methods give insight into the rates of template decomposition and/or oxidation. The SAPO membranes were heated more slowly and only to 673 K where they were held for 4 hours, whereas the SAPO crystals were heated to 973 K. Correspondingly, the conditions for template removal were studied for a series of SAPO-34 membranes that were prepared by the same synthesis procedure. To remove the templates, membranes were held at 673 K in air, in $N_2$, or under vacuum. The ability of these membranes to separate 50/50 molar $CO_2/CH_4$ mixtures at 4.6 MPa feed pressure and 84 kPa permeate pressure were then measured to determine the effect of different template removal conditions. This high feed pressure is demanding for zeolite membranes separations because the percentage flow through defects increases as the pressure increases, and thus high-pressure separations is a good measure of membrane quality.

The TPD and TPO measurements showed that the templates were removed from SAPO-34 crystals at lower temperatures in an inert gas than in air or oxygen. Correspondingly, the membranes prepared by heating in $N_2$ or under vacuum had fluxes for $CO_2/CH_4$ separations that were twice as high as the fluxes for membrane prepared in air, and the selectivities were only slightly lower. The membrane preparation was also reproducible. These results indicate that template removal in the absence of significant quantities of oxygen might be advantageous for other types of zeolite membranes as well.

EXAMPLES

Example 1

Synthesis of Membranes

1. Seed Synthesis

The SAPO-34 membranes were prepared on tubular supports that were first seeded with SAPO-34 crystals. The membrane synthesis gel used to grow the seed crystals had a molar ratio of 1.0 $Al_2O_3$:2.0 $P_2O_5$:0.6 $SiO_2$:4.0 TEAOH:75 $H_2O$, where TEAOH is tetra-ethyl ammonium hydroxide. To prepare the seeds, the $Al(i-C_3H_7O)_3$ (98%), $H_3PO_4$ (85 wt % aqueous solution), and deionized (DI) $H_2O$ were stirred for 3 hours to form an homogeneous solution, and then Ludox AS-40 colloidal silica (40 wt % $SiO_2$ suspension in water) was added, and the resulting solution was stirred for another 3 hours.

The TEAOH templating agent (35 wt % aqueous solution) was then added, and the solution was stirred overnight at room temperature. The solution was then placed in an autoclave and heated in a microwave oven (CEM Mars Microwave Reaction System with XP-1500 plus reactor) at 453 K for 7 hours. After the solution cooled to room temperature, it was centrifuged at 6000 rpm for 30 min to separate the seeds, which were then washed with deionized (DI) water. This centrifugation and washing procedure was repeated three times, and the resulting precipitate was dried overnight at 373 K.

2. Membrane Preparation

Alumina tubular supports (11-mm OD, 7-mm ID) from Inopor GmbH were cut into 6-cm long pieces, and the ends were glazed with high-temperature ceramic glaze. These asymmetric supports are nanofiltration membranes that are designed to permeate materials smaller than 100 nm. Before the supports were seeded with the SAPO-34 crystals, they were boiled in DI water and in ethanol for 3 hours each and dried overnight at 373 K under vacuum.

The synthesis gel for membrane preparation had a molar ratio of 1.0 $Al_2O_3$:1.0 $P_2O_5$:0.3 $SiO_2$:TEAOH:1.6 DPA:150 $H_2O$, where DPA is dipropylamine. Both TEAOH and DPA were used as templating agents because a previous study found that better quality membranes were obtained when these two templates were used. All chemicals were purchased from Sigma-Aldrich and used as received. The $Al(i-C_3H_7O)_3$ (98%), $H_3PO_4$ (85 wt % aqueous solution), and deionized $H_2O$ were stirred for 3 hours to form an homogeneous solution, and then Ludox AS-40 colloidal silica was added, and the resulting solution was stirred for another 3 hours. Then TEAOH (35 wt % aqueous solution) was added, and the solution was stirred for 1 hour. After the addition of DPA (99%), the solution was stirred for 4 days at 318-323 K before membrane synthesis.

The inside of the supports were seeded by rubbing them with SAPO-34 seeds. The outside of the seeded supports were then wrapped with Teflon tape and placed in an autoclave, which was then filled with the membrane synthesis gel. Hydrothermal synthesis was carried out at 493 K for 6 hours, and the membranes were then washed for 15 min with tap water and dried for ~2 hours at 393 K. A total of 36 membranes were prepared for this study.

Example 2

Template Removal

The templates were removed from the SAPO-34 membranes under vacuum, in flowing $N_2$ (an inert gas under these conditions), in flowing air, and in stagnant air. The gas flow rates were 50 $cm^3$/min. The membranes were heated to and held at 673 K for 4 hours with a heating rate of 0.8 K/min. They were then cooled to room temperature at a rate of 0.8 K/min. For template removal under vacuum, a vacuum chamber with a pressure of approximately $10^{-7}$ kPa was connected to a quartz tube, and the membranes were placed in the tube.

The templating agents were removed in flowing $N_2$ or air in a 1-m long and 1.5-cm diameter aluminum tube, which was centered in a ceramic tubular furnace with 7.5-cm ID. Membranes with ceramic rings wrapped around the glazed edges were placed at the center of the quartz or aluminum tubes. $Al_2O_3$-supported membranes were also calcined in stagnant air at 673 K for 4 hours in the ceramic tubular furnace.

Example 3

Temperature Programmed Desorption and Oxidation

Temperature-programmed desorption and oxidization (TPD, TPO) were carried out in flowing helium (TPD), air (TPO), or $O_2$ (TPO). The SAPO-34 crystals that were used in TPD and TPO were collected from the bottom of the autoclave after membrane synthesis. One hundred mg of SAPO-34 crystals were placed on a quartz frit in a quartz tube. Gases flowed through the reactor at 50 $cm^3$/min, and their flow rates were controlled by mass flow controllers. The quartz tube was surrounded by an electrical furnace, which consisted of NiCr wire wrapped around a quartz cylinder. A thermocouple was placed in the center of the SAPO-34 samples, and the temperature was increased at a constant rate of 10 K/min to 973 K for TPD and TPO measurements. For one TPD, a membrane was used instead of SAPO-34 crystals, and the temperature was increased at a rate of 0.8 K/s to mimic the conditions used during template removal.

The effluent from the reactor was monitored immediately downstream using a SRS QMS 200 quadrupole mass spectrometer that was interfaced to a computer. Before each TPD/TPO run, the zeolite crystals were held at 373 K in flowing gas for 30 minutes. For some measurements, TPD was carried out to 773 K, the sample was cooled to 373 K, and then TPO was carried out in $O_2$ to 1023 K. The mass spectrometer was calibrated with water, ethylene, and $CO_2$ using liquid and gas-tight syringes that injected these components through an injection port downstream of the zeolite sample. Calibrations for the higher molecular weight hydrocarbons were estimated to be the same as i-butane (m/z=43).

Example 4

Separation Measurements

Carbon dioxide/methane mixtures (50/50) were separated at 295 K in a flow system that was described previously (Avila et al., J. Membr. Sci., 335 (2009) p. 32). The feed pressure was 4.6 MPa and the permeate pressure was 84 kPa, and both pressures were controlled with back pressure regulators. The feed flow rate was 35 $cm^3$/s (standard conditions) to minimize concentration polarization, and the flow rates were controlled by mass flow controllers. No sweep gas was used. Permeate fluxes were measured with a bubble flow meter, and permeate and retentate compositions were analyzed by a SRI 8610C GC with a TC detector and a Hayesep D column at 373 K. The membranes were sealed in a stainless steel module with silicone O-rings. In addition to the high feed flow rates to minimize concentration polarization, cylindrical Teflon inserts were placed inside the tubes to reduce the cross section for flow through the membrane tube and thus increase gas velocity. It has been seen previously that at high pressures, for membranes with high permeances, concentration polarization decreased both the permeance and selectivity (Avila et al., J. Membr. Sci., 335 (2009) p. 32). All pressure drops used in permeance calculations are log mean partial pressure drops because the feed concentration profile changes along the membrane length.

Example 5

SAPO-34 Crystal Characterization

FIG. 1a shows SEM images of SAPO-34 crystals that were used as seeds for membrane preparation. They had rectangular plate morphology and were about 300-nm long and 60-nm wide. The loose SAPO-34 crystals that were used for TPD and TPO experiments were collected from the bottom of the autoclave during membrane synthesis, and are shown in FIG. 1b. They were cubic and had diameters of 2 to 6 μm. X-ray diffraction patterns indicated that both seeds and crystals had the chabazite (CHA) structure of SAPO-34 (van Heyden et al., Chem. Mater., 20 (2008) p. 2956; Li et al., J. Membr. Sci. 352, (2008) p. 7).

Figure 2:
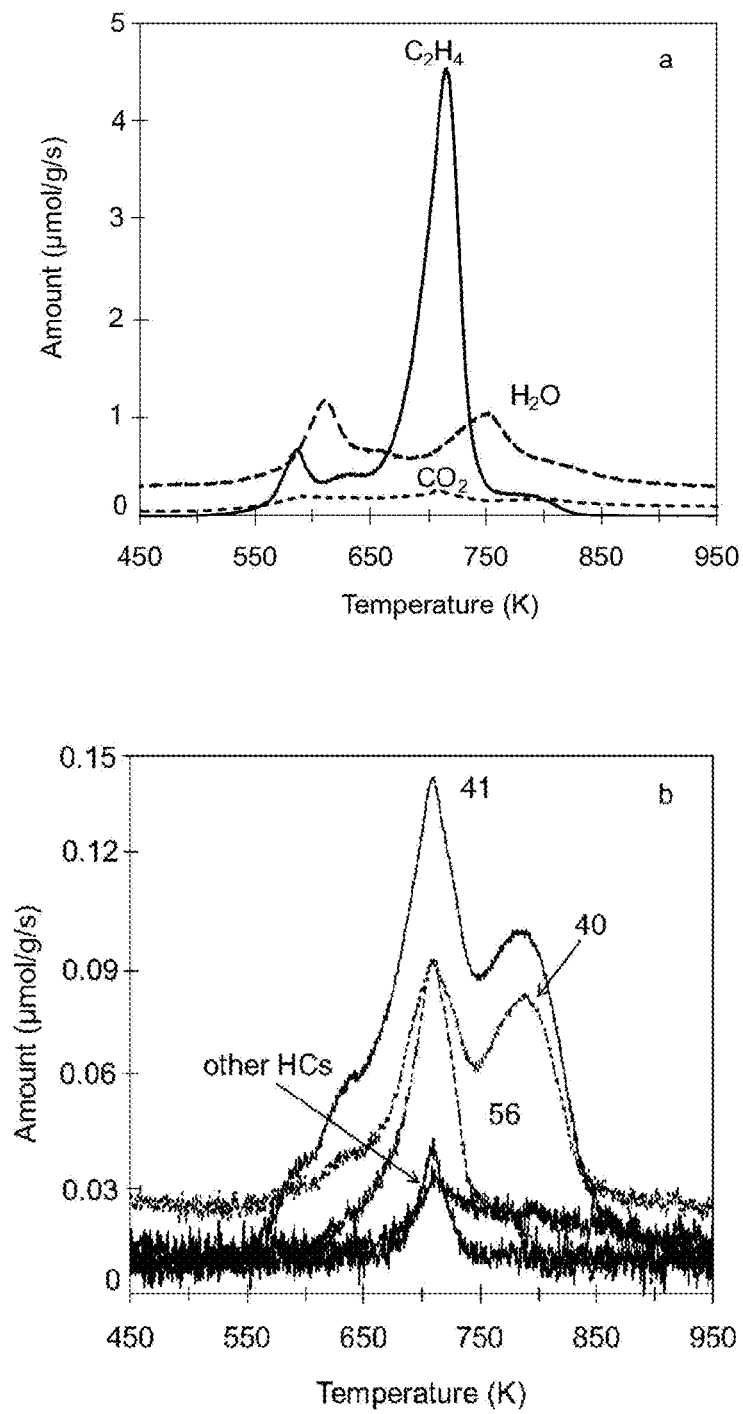
FIGS. 2a and 2b illustrate temperature-programmed desorption in helium of SAPO-34 crystals that contained TEAOH and DPA templates with a heating rate of 10 K/min. The figures also show the formation of $CO_2$, $C_2H_4$ and $H_2O$ (FIG. 2a) and other products (FIG. 2b) at various temperatures.

The templating agents began to decompose around 550 K during TPD of SAPO-34 crystals in helium. As shown in FIG. 2a, the main product was $C_2H_4$ (m/z=26), which formed mostly in a peak at 715 K. The $C_2H_4$ contained 85% of the total carbon in the gas phase products. Small amounts of $CO_2$ (m/z=44) and $H_2O$ (m/z=18) also formed (FIG. 2a). Ethylamine, diethylamine, $C_3$ hydrocarbons (m/z=40 and 41) and $C_4$ hydrocarbons (m/z=56) were also detected (FIG. 2b), but their amounts were only 0.1-0.2% of the $C_2H_4$ amount. Almost all the decomposition products, except water, had formed and desorbed by 775 K. The SAPO-34 crystals were light grey after TPD, indicating some template residue. The decomposition compounds in the TPD spectrum are similar to those reported previously for the decomposition of TEAOH template in Beta zeolite crystals (Bourgeat-Lami et al., J. Phys. Chem., 96 (1992) p. 3807).

Figure 3:
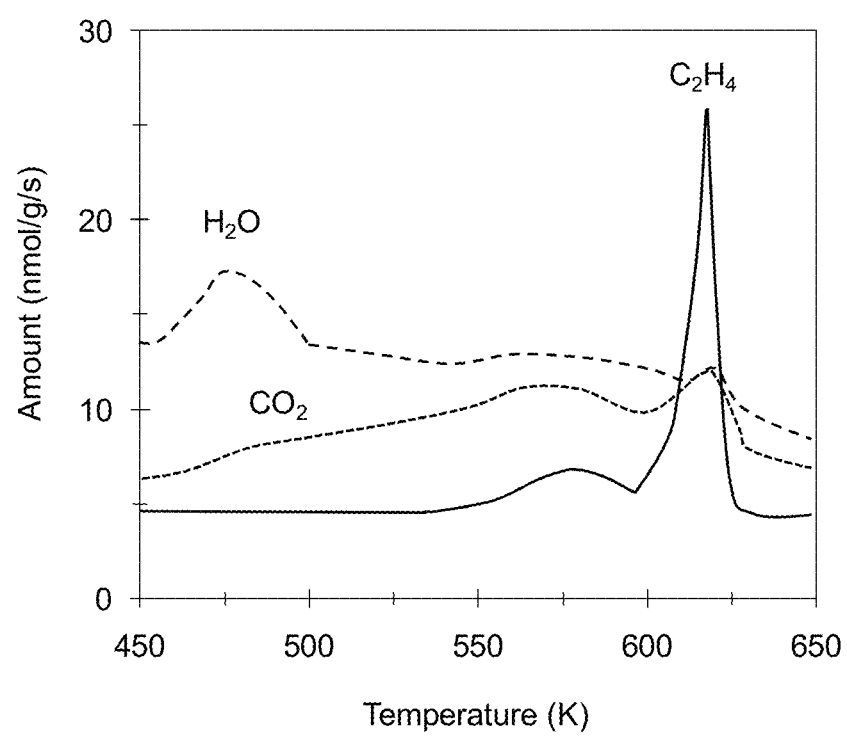
FIG. 3 illustrates temperature-programmed desorption in helium of SAPO-34 membrane that contained TEAOH and DPA templates with a heating rate of 0.8 K/min. The formation of $CO_2$, $C_2H_4$ and $H_2O$ at various temperatures is also shown.

The $C_2H_4$ formed with a peak temperature of 715 K during TPD at a heating rate of 10 K/min. When TPD was carried out on a membrane, but at a heating rate of 0.8 K/min in order to mimic the conditions using during template removal from the membranes, the $C_2H_4$ peak (FIG. 3) was at a lower temperature, 625 K, as expected for the lower heating rate. This shift in peak temperature with heating rate corresponds to an activation energy of 93 kJ/mol (Falconer and Schwarz, Catal. Rev., 25 (1983) p. 141). This indicates that the decomposition of templates was complete by 673 K during template removal. The $C_2H_4$ formation in FIG. 2a is asymmetric, as expected for a first-order process.

The amount of carbon in the crystals after TPD in helium was determined by interrupting the TPD at 773 K, cooling the sample, and then heating it in $O_2$ to 1025 K. A small amount of water desorbed at low temperature, apparently due to a low concentration of water in the helium or oxygen stream. A small amount of water and $CO_2$ formed above 673 K. The $CO_2$ corresponded to 7% of the carbon that was in the original template. When crystals were held in helium at 673 K for 4 hours and then heated to 973 K in air, the $CO_2$ that formed during heating in air corresponded to less than 0.1% of the original template.

Previous studies on Beta zeolite indicate that the $C_2H_4$ peak at 585 K and the water peak at 605 K are due to TEAOH decomposition by Hofmann elimination (Bourgeat-Lami et al., J. Phys. Chem., 96 (1992) p. 3807):

$$Et_4N^+OH^- \rightarrow C_2H_4 + Et_3N + H_2O \qquad (1)$$

Successive β-elimination of triethylamine forms C2H4 and the lower amines:

$$Et_3N \rightarrow C_2H_4 + Et_2NH \qquad (2)$$

$$Et_2NH \rightarrow C_2H_4 + EtNH_2 \qquad (3)$$

However, the $C_2H_4$ peak area at 715 K is more than three times larger than the peak area of the lower temperature $C_2H_4$ peaks, so insufficient $C_2H_4$ formed in the low temperature peak for reaction (1) to go to completion at low temperature. Since two templates were used in the SAPO-34 membrane preparation, and the crystals were collected from membrane preparation, the reaction steps may be more complicated.

Figure 4:
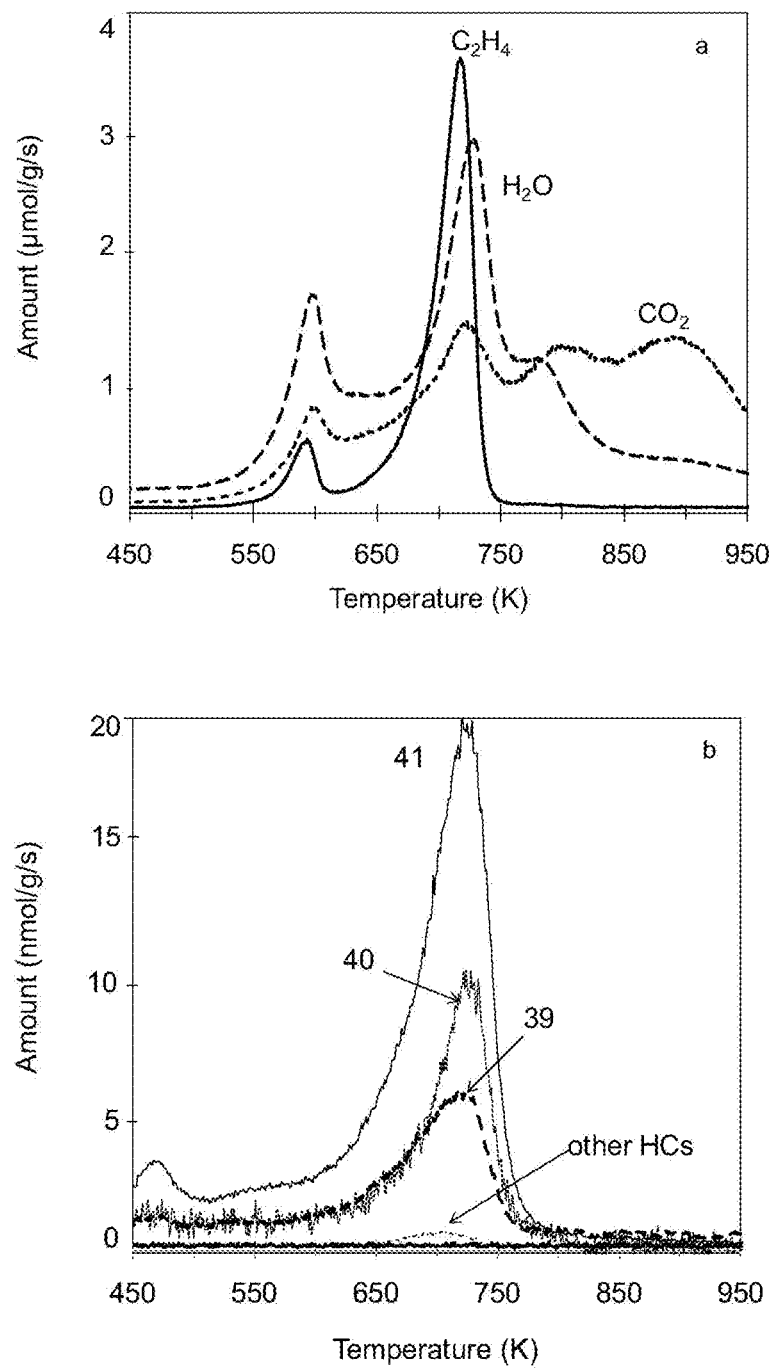
FIGS. 4a and 4b illustrate temperature-programmed oxidation in air of SAPO-34 crystals that contained TEAOH and DPA templates with a heating rate of 10 K/min. The figures also show the formation of $CO_2$, $C_2H_4$ and $H_2O$ (FIG. 4a) and other products (FIG. 4b) at various temperatures.

The same products were observed during TPO in air and in $O_2$ as seen during TPD in helium. The templating agents began to decompose and oxidize above 525 K during TPO in air. As shown in FIG. 4a, much more $CO_2$ and $H_2O$ formed during TPO in air, and less $C_2H_4$ formed; 55% of the carbon in the templates was oxidized to $CO_2$. Although ethylene formation stopped by 750 K, $H_2O$ and $CO_2$ continued forming up to 950 K, where heating was stopped. Ethylene formed in two peaks, with peak temperatures of 585 and 715 K, and 86% of the $C_2H_4$ formed in the higher temperature peak. Water also had peaks at similar temperatures, and additional water formed at higher temperatures where $CO_2$ also formed.

Ethylamine (m/z=30), diethylamine (m/z=72), and higher hydrocarbons (m/z=39, 41, 43, 52, 56) were also detected by the mass spectrometer, but the largest of these signals (m/z=41, FIG. 4b) was only 0.6% of the $C_2H_4$ amount.

Figure 5:
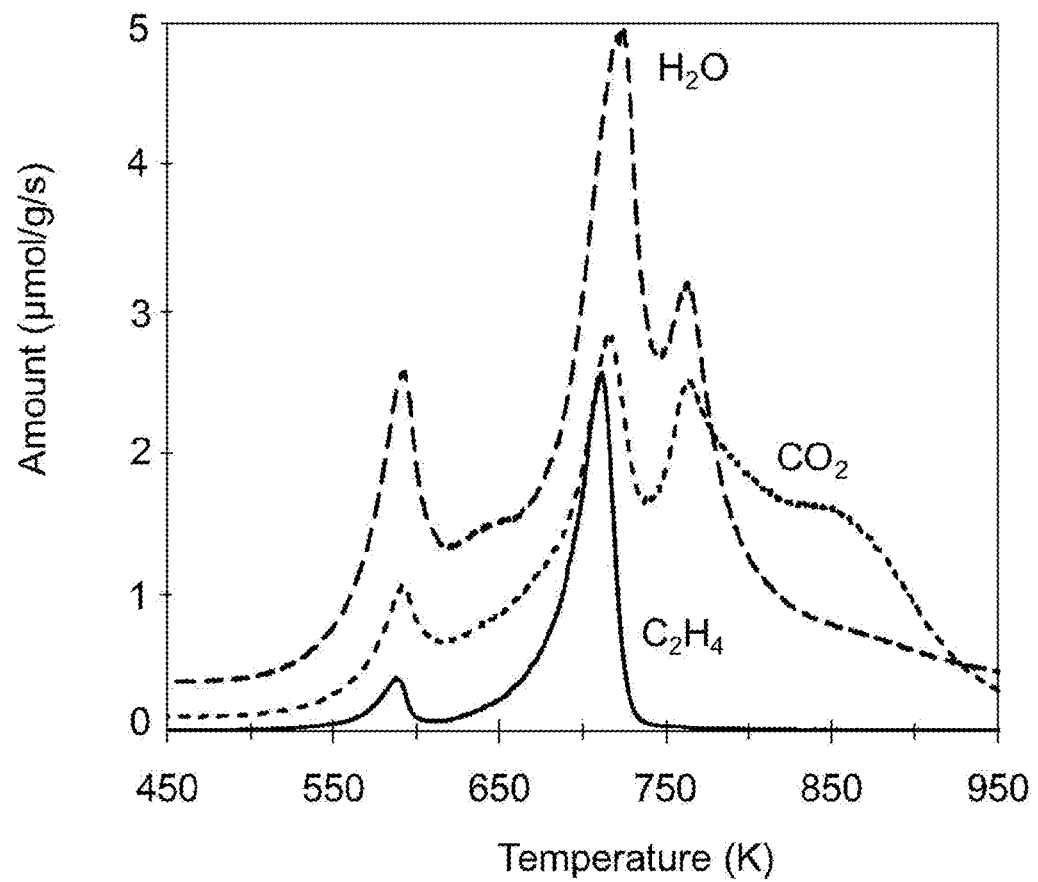
FIG. 5 illustrates temperature-programmed oxidation in $O_2$ of SAPO-34 crystals that contained TEAOH and DPA templates with a heating rate of 10 K/min. The formation of $CO_2$, $C_2H_4$ and $H_2O$ at various temperatures is also shown.

Similar behavior was observed during TPO in $O_2$ instead of air, but the higher $O_2$ concentration increased the oxidation rate. Thus, as shown in FIG. 5, significantly less $C_2H_4$ and significantly more $CO_2$ and $H_2O$ formed when $O_2$ was used instead of air. Less $CO_2$ formed above 873 K, and the $CO_2$ rate was close to zero when heating was stopped at 950 K. Comparing the TPD and TPO spectra suggest that some of the templating agents were partially oxidized to a more stable surface species before they reach temperatures where they decomposed to form $C_2H_4$. These partial oxidation products were only oxidized to $CO_2$ and $H_2O$ at higher temperatures. The $H_2O/CO_2$ ratio was lower above 775 K, apparently because the species being oxidized was more carbon-rich than the original template.

The higher $O_2$ concentration when $O_2$ was used apparently increased both the partial oxidation rate at lower temperatures and the complete oxidation rate at higher temperatures. The rate of $CO_2$ formation was higher in $O_2$ than in air between 675 and 925 K, apparently due to a high oxidation rate of the partial oxidation products.

The $C_2H_4$ that formed during TPO would be removed from SAPO-34 membranes during calcination at 673 K for 4 hours, as explained above for TPD. However, the partial oxidation products that remained on the surface and were oxidized to $CO_2$ with peak temperatures of 800 and 900 K in FIG. 5 are much less likely to be completely removed in 4 hours in air at 673 K. Thus, the temperature programmed results suggest that membrane calcination in air at 673 K for 4 hours leaves small but significant amounts of the template in the membrane, but 4 hours at 673 K in an inert gas will remove almost all the template.

Example 6

Carbon Dioxide/Methane Separation

Because template removal from SAPO-34 crystals is affected by the presence of $O_2$, the separation properties of SAPO-34 membranes also depend on the conditions used for template removal. Significantly, higher permeances were obtained when the templates were removed in $N_2$ or under vacuum than when they were removed in air. Table 1 compares the $CO_2$ permeances and $CO_2/CH_4$ separation selectivities at 4.6 MPa feed pressure for 15 membranes prepared by the same procedure, on the same porous alumina supports, but with different template removal conditions.

TABLE 1

Separation performance of a 50/50 $CO_2/CH_4$ mixture at room temperature using SAPO-34 membranes on $Al_2O_3$ supports with 100-nm pores. Templating agents were removed at 673 K for 4 hours in flowing $N_2$, in flowing air, and under vacuum for five membranes.

| Membrane | Gas phase during template removal | $CO_2$ permeance × $10^7$ mol/ $(m^2 \cdot s \cdot Pa)$ | $CO_2/CH_4$ Selectivity |
| --- | --- | --- | --- |
| V1 | vacuum | 6.5 | 55 |
| V2 | vacuum | 10.6 | 63 |
| V3 | vacuum | 9.4 | 54 |
| V4 | vacuum | 5.8 | 47 |
| V5 | vacuum | 8.9 | 57 |
| Average | vacuum | 8.2 ± 2 | 55 ± 6 |
| N1 | $N_2$ | 7.7 | 60 |
| N2 | $N_2$ | 9.7 | 46 |
| N3 | $N_2$ | 5.5 | 55 |
| N4 | $N_2$ | 6 | 42 |
| N5 | $N_2$ | 8.7 | 48 |
| Average | $N_2$ | 7.5 ± 2 | 50 ± 7 |
| A1 | air | 4.8 | 61 |
| A2 | air | 5.3 | 63 |
| A3 | air | 2.3 | 75 |
| A4 | air | 4.6 | 52 |
| A5 | air | 3.6 | 48 |
| Average | air | 4.1 ± 1.2 | 60 ± 11 |

The templating agents were removed at 673 K for 4 hours in flowing $N_2$ for five membranes, in flowing air for five membranes, and under vacuum for five membranes. The reproducibility of membrane preparation was good, as indicated by the standard deviations for each group of five membranes. Most significantly, the $CO_2$ permeances for membranes whose templating agent was removed under vacuum were twice the $CO_2$ permeances for membranes that used flowing air for template removal. Their average $CO_2$ permeance under vacuum was $8.2 \pm 2 \times 10^{-7}$ mol/$(m^2 \cdot s \cdot Pa)$ with an average $CO_2/CH_4$ selectivity of 55±6. The higher permeances were accompanied by $CO_2/CH_4$ selectivities that were only 8% lower. Membranes whose templating agents were removed in flowing $N_2$ have $CO_2$ permeances that were almost as high as for membranes that used vacuum (only 8.5% lower). Their selectivities were also 9% lower than the membranes that used a vacuum for template removal.

As a further comparison, an additional ten membranes were prepared on the same alumina support, and they were calcined in stagnant instead of flowing air at 673 K for 4 hours. As shown in Table 2, these membranes also had significantly lower permeances than membranes whose templates were removed in flowing $N_2$ or under vacuum. Their $CO_2$ permeances were, on average, 12% lower than membrane calcined in flowing air, and their average selectivities were identical to those in flowing air. Thus, template removal under vacuum yields SAPO-34 membranes with much higher permeances for high pressure $CO_2/CH_4$ separations, and template removal in flowing $N_2$ is almost as good as removal under vacuum. Both methods of template removal yield reproducible membranes.

TABLE 2

Separation performance of a 50/50 $CO_2/CH_4$ mixture at room temperature using SAPO-34 membranes on $Al_2O_3$ supports with 100-nm pores. Templates were removed at 673 K in stagnant air for 4 hours.

| Membrane | $CO_2$ permeance × $10^7$ mol/ ($m^2 \cdot s \cdot Pa$) | $CO_2/CH_4$ Selectivity |
| --- | --- | --- |
| SA1 | 2.4 | 61 |
| SA2 | 3.2 | 67 |
| SA3 | 3.3 | 56 |
| SA4 | 2.6 | 53 |
| SA5 | 2.6 | 43 |
| SA6 | 4.6 | 64 |
| SA7 | 3.2 | 60 |
| SA8 | 5.5 | 67 |
| SA9 | 5.2 | 57 |
| SA10 | 4.5 | 66 |
| Average | 3.6 ± 1.2 | 60 ± 8 |

The zeolite layers of membranes that were calcined in air were brownish in color, likely due to incomplete template removal and the formation of higher molecular weight compounds or coke. These species may block some SAPO-34 pores and reduce the $CO_2$ permeance, and they may be responsible for the slightly higher selectivities for membranes calcined in air if they deposit in membrane defects. All the membranes whose templates were removed in $N_2$ or under vacuum were white or only slightly discolored, suggesting that fewer higher molecular weight compounds remained on the membranes whose templates were removed in the absence of oxygen.

SAPO-34 membranes grown on alumina supports and whose templates were removed in flowing $N_2$ or under vacuum had $CO_2$ permeances that were, on average, almost twice as high as membranes whose templates were removed in flowing air. The $CO_2/CH_4$ separation selectivities at 4.6 MPa feed pressure were only 8% lower. The average $CO_2$ permeance during $CO_2/CH_4$ separations at 4.6 MPa for membranes treated under vacuum was $8.2 \pm 2 \times 10^{-7}$ mol/($m^2 \cdot s \cdot Pa$) with an average $CO_2/CH_4$ selectivity of 55±6. The higher permeances were apparently due to more complete removal of templates at 673 K. Temperature-programmed desorption and oxidation showed that templates were removed at lower temperatures from SAPO-34 crystals in the absence of oxygen. In the presence of oxygen, some of the template appeared to be oxidized to more stable species that remained in the SAPO-34 crystals to higher temperatures, and these species may be responsible for the lower permeances in the membranes.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, reagents, purification methods, materials, substrates, device elements, analytical methods, assay methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art. For example, when a compound is claimed, it should be understood that compounds known in the art including the compounds disclosed in the references disclosed herein are not intended to be included in the claim.

The invention claimed is:

1. A method for making a crystalline silicoaluminophosphate (SAPO) membrane, the method comprising the steps of:
    a) providing a porous support having a first and a second side;
    b) preparing an aqueous SAPO forming membrane gel, wherein the membrane gel comprises aluminum, phosphorus, silicon, oxygen, an organic templating agent and water;
    c) contacting at least one side of the porous support with the membrane forming gel;
    d) following the contacting step in step c), heating the porous support and the membrane gel to form a membrane layer of SAPO crystals on the porous support; and
    e) heating the membrane layer at a temperature from about 600 K to about 1050 K in a vacuum thereby removing the templating agent from the membrane layer.

2. The method of claim 1 wherein said SAPO membrane is a SAPO-34 membrane.

3. The method of claim 1 wherein the membrane layer is heated at a temperature from about 650 K to about 700 K.

4. The method of claim 1 wherein the membrane layer is heated at a temperature from about 650 K to about 675 K.

5. The method of claim 1 wherein 95% or more of the templating agent is removed when the membrane layer is heated.

6. The method of claim 1 wherein 99% or more of the templating agent is removed when the membrane layer is heated.

7. The method of claim 1 wherein the heating of the membrane layer does not form oxidized derivatives from the templating agent.

8. The method of claim 1 wherein the templating agent is a quaternary organic ammonium templating agent.

9. The method of claim 1 wherein the templating agent is selected from the group consisting of tetrapropyl ammonium hydroxide (TPAOH), tetrapropyl ammonium bromide, tetrabutyl ammonium hydroxide, tetrabutyl ammonium bromide, tetraethyl ammonium hydroxide (TEAOH), tetraethyl ammonium bromide, tetraethylammonium chloride (TEACl), dipropylamine (DPA), N,N-dimethylbutylamine (DMBA), N,N-dimethylethanolamine (DMEA), morpholine (MOR), cyclohexylamine(CHA) and combinations thereof.

10. The method of claim 1 wherein said membrane gel comprises two or more templating agents, and wherein heating the membrane layer removes each of the templating agents.

11. The method of claim 10 wherein one of the two or more templating agents is a quaternary organic ammonium templating agent and one of the two or more templating agents is a primary, secondary or tertiary amine having 12 carbon atoms or less.

12. The method of claim 10 wherein one of the two or more templating agents agent is selected from the group consisting of tetrapropyl ammonium hydroxide (TPAOH), tetrapropyl ammonium bromide, tetrabutyl ammonium hydroxide, tetrabutyl ammonium bromide, tetraethyl ammonium hydroxide (TEAOH), tetraethyl ammonium bromide, tetraethylammonium chloride (TEACl), dipropylamine (DPA), N,N-dimethylbutylamine (DMBA), N,N-dimethylethanolamine (DMEA), morpholine (MOR), cyclohexylamine(CHA) and combinations thereof.

13. The method of claim 1 wherein no additional calcination steps are performed to remove the templating agent.

14. The method of claim 1 wherein the template removal step is performed by heating the membrane for 3.5 hours to 4.5 hours at a temperature from about 650 K to about 675 K.

15. A crystalline silicoaluminophosphate (SAPO) membrane generated by:
    a) providing a porous support having a first and a second side;
    b) preparing an aqueous SAPO forming membrane gel, wherein the membrane gel comprises aluminum, phosphorus, silicon, oxygen, an organic templating agent and water;
    c) contacting at least one side of the porous support with the membrane forming gel;
    d) following the contacting step in step c), heating the porous support and the membrane gel to form a membrane layer of SAPO crystals on the porous support; and
    e) heating the membrane layer at a temperature from about 600 K to about 1050 K in a vacuum thereby removing the templating agent from the membrane layer.

16. The membrane of claim 15 wherein the membrane layer is heated at a temperature from about 650 K to about 700 K.

17. The membrane of claim 15 wherein the template removal step is performed by heating the membrane for 3.5 hours to 4.5 hours at a temperature from about 650 K to about 675 K.

18. The membrane of claim 15 wherein the templating agent is selected from the group consisting of tetrapropyl ammonium hydroxide (TPAOH), tetrapropyl ammonium bromide, tetrabutyl ammonium hydroxide, tetrabutyl ammonium bromide, tetraethyl ammonium hydroxide (TEAOH), tetraethyl ammonium bromide, tetraethylammonium chloride (TEACl), dipropylamine (DPA), N,N-dimethylbutylamine (DMBA), N,N-dimethylethanolamine (DMEA), morpholine (MOR), cyclohexylamine(CHA) and combinations thereof.

19. The membrane of claim 15 wherein said membrane gel comprises two or more templating agents, and wherein heating the membrane layer removes each of the templating agents.

20. The membrane of claim 15 wherein no additional calcination steps are performed to remove the templating agent.

21. The membrane of claim 15 wherein the thickness of the SAPO layer is less than about 10 μm.

22. The membrane of claim 15 wherein the thickness of the SAPO layer is between approximately 5 μm and 6 μm.

23. The membrane of claim 15 wherein the membrane has a carbon dioxide/methane ($CO_2/CH_4$) separation selectivity of 50 or greater for an approximately 50/50 molar $CO_2/CH_4$ mixture at room temperature with a feed pressure of 4.6 MPa and a permeate pressure of 84 kPa.

24. The membrane of claim 15 wherein the membrane has a $CO_2/CH_4$ separation selectivity of 55 or greater for an approximately 50/50 molar $CO_2/CH_4$ mixture at room temperature with a feed pressure of 4.6 MPa and a permeate pressure of 84 kPa.

25. The membrane of claim 15 wherein the membrane has a $CO_2$ permeance of $7.5 \times 10^{-7}$ mol/(m²·s·Pa) or greater for an approximately 50/50 molar $CO_2/CH_4$ mixture at room temperature with a feed pressure of 4.6 MPa and a permeate pressure of 84 kPa.

26. The membrane of claim 15 wherein the membrane has a $CO_2$ permeance of $8.2\times10^{-7}$ mol/($m^2 \cdot s \cdot Pa$) or greater for an approximately 50/50 molar $CO_2/CH_4$ mixture at room temperature with a feed pressure of 4.6 MPa and a permeate pressure of 84 kPa.

27. The membrane of claim 15 wherein the membrane has a $CO_2$ permeance of $5.8\times10^{-7}$ mol/($m^2 \cdot s \cdot Pa$) or greater and a $CO_2/CH_4$ separation selectivity of 45 or greater for an approximately 50/50 molar $CO_2/CH_4$ mixture at room temperature with a feed pressure of 4.6 MPa and a permeate pressure of 84 kPa.

28. The membrane of claim 15 wherein the membrane has at least 30% greater $CO_2$ permeance over membranes prepared in the same manner except that the templating agent was removed in the presence of $O_2$.

29. A method for separating a first gas component from a gas mixture containing at least a first and a second gas component, the method comprising the steps of:
   a) providing a crystalline silicoaluminophosphate (SAPO) membrane, the membrane having a feed and a permeate side and being selectively permeable to the first gas component over the second gas component, wherein the SAPO membrane is made by:
      i) providing a porous support having a first and a second side;
      ii) preparing an aqueous SAPO forming membrane gel, wherein the membrane gel comprises aluminum, phosphorus, silicon, oxygen, an organic templating agent and water;
      iii) contacting at least one side of the porous support with the membrane forming gel;
      iv) following the contacting step in step iii), heating the porous support and the membrane gel to form a membrane layer of SAPO crystals on the porous support; and
      v) heating the membrane layer at a temperature from about 600 K to about 1050 K in a vacuum thereby removing the templating agent from the membrane layer;
   b) applying a feed stream including the first and the second gas components to the feed side of the membrane; and
   c) providing a driving force sufficient for permeation of the first gas component through the membrane, thereby producing a permeate stream enriched in the first gas component from the permeate side of the membrane.

30. The method of claim 29, wherein the first gas component is carbon dioxide ($CO_2$) and the second gas component is methane ($CH_4$).

31. A method for making a crystalline silicoaluminophosphate (SAPO) membrane, the method comprising the steps of:
   a) providing a porous support having a first and a second side;
   b) preparing an aqueous SAPO forming membrane gel, wherein the membrane gel comprises aluminum, phosphorus, silicon, oxygen, an organic templating agent and water;
   c) contacting at least one side of the porous support with the membrane forming gel;
   d) following the contacting step in step c), heating the porous support and the membrane gel to form a membrane layer of SAPO crystals on the porous support; and
   e) heating the membrane layer at a temperature from about 650 K to about 700 K in an atmosphere having an $O_2$ concentration less than 1% thereby removing the templating agent from the membrane layer.

32. The method of claim 31 wherein said SAPO membrane is a SAPO-34 membrane.

33. The method of claim 32 wherein the membrane layer is heated for 3.5 hours to 4.5 hours at a temperature from about 650 K to about 675 K in an atmosphere having an $O_2$ concentration less than 1%.

34. The method of claim 32 wherein said membrane gel comprises two or more templating agents, and wherein heating the membrane layer removes each of the templating agents.

35. The method of claim 32 wherein no additional calcination steps are performed to remove the templating agent.

* * * * *